United States Patent
Patil et al.

(10) Patent No.: US 12,524,429 B2
(45) Date of Patent: Jan. 13, 2026

(54) COMPRESSION-BASED DATA INSTANCE SEARCH

(71) Applicant: Pienomial Inc., Rockville, MD (US)

(72) Inventors: Omkar K. Patil, Pune (IN); Srinivas Padmanabharao, Mississauga (CA); Sanat Mohanty, Rockville, MD (US)

(73) Assignee: Pienomial Inc., Rockville, MD (US)

( * ) Notice: Subject to any disclaimer, the term of this patent is extended or adjusted under 35 U.S.C. 154(b) by 0 days.

(21) Appl. No.: 19/171,854

(22) Filed: Apr. 7, 2025

(65) Prior Publication Data

US 2025/0231957 A1  Jul. 17, 2025

Related U.S. Application Data

(63) Continuation of application No. 18/972,758, filed on Dec. 6, 2024, now abandoned.

(60) Provisional application No. 63/720,148, filed on Nov. 13, 2024, provisional application No. 63/607,714, filed on Dec. 8, 2023.

(51) Int. Cl.
*G06F 17/00* (2019.01)
*G06F 16/25* (2019.01)
*G06F 16/93* (2019.01)
*H04L 9/00* (2022.01)

(52) U.S. Cl.
CPC ............ *G06F 16/254* (2019.01); *G06F 16/93* (2019.01); *H04L 9/008* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS 8,463,000 B1 * 6/2013 Kaminski, Jr. ........ G06F 16/325
  382/218
8,481,267 B2 * 7/2013 Burns .................... C12Q 1/686
  435/6.12

(Continued)

OTHER PUBLICATIONS

IBM, "What is homomorphic encryption?," date unknown, 5 pages, [Online] [Retrieved on May 8, 2025] Retrieved from the Internet <URL: https://www.ibm.com/think/topics/homomorphic-encryption >.

*Primary Examiner* — Hung D Le
(74) *Attorney, Agent, or Firm* — Fenwick & West LLP

(57) ABSTRACT

A knowledge management system may receive a set of data instances. The system may extract a plurality of entities from the set of data instances. The system may convert the plurality of entities into a plurality of entity embeddings, each entity embedding representing an entity in a latent space. The system may generate a reference embedding that has the same length as the plurality of entity embeddings. The system may compare, for each value in each entity embedding, the value to a corresponding value of the reference embedding. The system may generate a plurality of entity fingerprints, each entity fingerprint corresponding to an entity embedding, each entity fingerprint comprising Boolean values that are generated based on comparing values in each entity embedding to corresponding values of the reference embedding. The system may store the plurality of entity fingerprints to represent the plurality of entities.

19 Claims, 16 Drawing Sheets

(56) References Cited

U.S. PATENT DOCUMENTS

| | | | | |
|---|---|---|---|---|
| 8,886,531 | B2* | 11/2014 | Vogel | G10L 25/48 |
| | | | | 704/239 |
| 9,230,151 | B2* | 1/2016 | Han | G06V 40/1365 |
| 9,727,614 | B1* | 8/2017 | Sarmento | G06F 16/2457 |
| 9,747,628 | B1* | 8/2017 | Sarmento | G06Q 30/0625 |
| 9,760,930 | B1* | 9/2017 | Sarmento | G06F 16/9538 |
| 10,026,107 | B1* | 7/2018 | Sarmento | G06Q 30/06 |
| 10,235,765 | B1* | 3/2019 | Charlton | G06V 10/22 |
| 10,304,111 | B1* | 5/2019 | Sarmento | G06Q 30/0613 |
| 10,318,543 | B1* | 6/2019 | Sharifi | G06F 16/24573 |
| 11,244,135 | B2* | 2/2022 | Cheng | G06V 40/13 |
| 11,264,140 | B1* | 3/2022 | Tal | G16H 50/20 |
| 11,468,031 | B1* | 10/2022 | Hazel | G06F 16/2272 |
| 11,854,451 | B2* | 12/2023 | Cheng | G09G 3/20 |
| 11,886,822 | B2* | 1/2024 | Creed | G06F 40/237 |
| 2003/0185417 | A1* | 10/2003 | Alattar | G06T 1/0064 |
| | | | | 382/100 |
| 2005/0187909 | A1* | 8/2005 | Delefevre | G06F 16/3323 |
| 2006/0013451 | A1* | 1/2006 | Haitsma | G06F 16/634 |
| | | | | 707/E17.009 |
| 2006/0288002 | A1* | 12/2006 | Epstein | G06F 16/41 |
| 2007/0033163 | A1* | 2/2007 | Epstein | G06V 20/48 |
| 2010/0205174 | A1* | 8/2010 | Jiang | G06F 16/683 |
| | | | | 707/723 |
| 2010/0318587 | A1* | 12/2010 | Seet | G06F 16/285 |
| | | | | 707/812 |
| 2012/0054194 | A1* | 3/2012 | Gao | G06F 18/24 |
| | | | | 707/E17.014 |
| 2013/0287270 | A1* | 10/2013 | Harper | G06V 10/7788 |
| | | | | 382/124 |
| 2014/0119619 | A1* | 5/2014 | Miesak | G06V 40/13 |
| | | | | 382/124 |
| 2015/0254338 | A1* | 9/2015 | Cheluvaraja | G10L 25/51 |
| | | | | 707/661 |
| 2019/0108187 | A1* | 4/2019 | Coover | G06F 16/61 |
| 2019/0278777 | A1* | 9/2019 | Malik | G06F 16/9024 |
| 2019/0340455 | A1* | 11/2019 | Jung | G06V 10/993 |
| 2020/0364269 | A1* | 11/2020 | Kwan | G06F 18/23 |
| 2021/0165827 | A1* | 6/2021 | Li | G10L 25/54 |
| 2022/0012464 | A1* | 1/2022 | Kim | G06V 40/13 |
| 2022/0114144 | A1* | 4/2022 | Hazel | G06F 16/1744 |
| 2022/0284021 | A1* | 9/2022 | Hazel | G06F 16/24539 |
| 2022/0309116 | A1* | 9/2022 | Antoniades | G06F 16/313 |
| 2022/0327859 | A1* | 10/2022 | Tanaka | G06T 1/00 |
| 2023/0067528 | A1* | 3/2023 | Guo | G06N 3/0895 |
| 2023/0169120 | A1* | 6/2023 | Goyal | G06F 18/22 |
| | | | | 707/769 |
| 2023/0386484 | A1* | 11/2023 | Jangi | G10L 25/18 |
| 2024/0012817 | A1* | 1/2024 | Mathew | G06F 16/242 |
| 2024/0028637 | A1* | 1/2024 | Colton | G06F 16/683 |

\* cited by examiner

Question: 

What are the main types of endometrial cancer, their relative prevalence, ~712
and the percentage breakdown of the most common histological subtypes?

Answer:
*(No content provided yet in the answer field.)*

1. Endometrial cancer is one of the most prevalent cancers in women and is usually diagnosed in early stages ~714

2. Overview
Endometrial cancer is the sixth most common neoplasm in women worldwide. In 2007 to 2007, rates varied 10-fold across countries.

3. Prevalence
Endometrial cancer is categorized into two main types based on histological characteristics: Type I and Type II. Type I cancers, primarily endometrioid, are more common, accounting for 80% of all endometrial cancers. Type II cancers are less common but more aggressive.

4. Risk Factors
Key risk factors for endometrial cancer include:
- Older age
- Early menarche and late menopause
- Obesity
- Family history of endometrial cancer
- Radiation exposure
- Infertility, especially if associated with polycystic ovary syndrome (PCOS)

5. Symptoms
The most common symptom of endometrial cancer is abnormal uterine bleeding. Other symptoms can include pelvic pain and uterine enlargement.

Home
Rch-POC    Knolets    Settings

18 Knolets                                              + Add New Knolet

| Source Links | Source Links |
|---|---|
| significant improvements in progression-free survival (PFS) compared to fulvestrant alone. | advanced breast cancer, showing improvements in overall survival (OS) and progression-free survival (PFS) when combined with endocrine therapy compared to placebo. |

7. Summary
The SOLAR-1 trial investigated the efficacy of alpelisib plus fulvestrant in patients with hormone receptor-positive, HER2-negative advanced breast cancer. The trial focused on the PIK3CA-mutant subgroup and demonstrated statistically significant improvements in progression-free survival (PFS) compared to fulvestrant alone.

8. Body
The SOLAR-1 trial (NCT02437318) enrolled 572 patients with hormone receptor-positive, HER2-negative advanced breast cancer who received prior endocrine therapy. Patients were enrolled into 2 cohorts based on PIK3CA mutation status (mutated vs non-mutated) and randomly assigned in a 1:1 ratio to receive 300 mg of alpelisib plus Source Links

11. Body
The provided abstract discusses the extended follow-up

13. Summary
The MONARCH-3 trial evaluated abemaciclib in combination with a nonsteroidal aromatase inhibitor

14. Body
The MONARCH-3 trial was a randomized, double-blind, phase 3 trial that evaluated the efficacy and safety of abemaciclib in combination with a nonsteroidal aromatase inhibitor (NSAI) as initial therapy for postmenopausal women with hormone receptor-positive (HR+), human epidermal growth factor receptor 2-negative (HER2-) advanced breast cancer (ABC).

The trial enrolled 493 patients, who were randomly assigned to receive either abemaciclib plus an NSAI (n = 328) or placebo plus an NSAI (n = 165). The primary endpoint was investigator-assessed progression-free survival (PFS). At the final PFS analysis, the median PFS Source Links

15. Title
MONARCH-3 Outcomes

Small Molecule Therapies
Review publications of small molecules targeting ER+/HER2- BC. Provide a summary The objective response rate (ORR) was 61.0% in the abemaciclib arm versus 45.5% in the placebo arm (measurable disease, p = 0.003). The median duration of response was longer in the abemaciclib arm (17.46 months) compared to the placebo arm (27.39 months). The safety profile of abemaciclib plus an NSAI was consistent with previous reports, with diarrhea as the most common treatment-emergent adverse event.

The provided abstract discusses the extended follow-up results of the MONALEESA-7 trial, which enrolled pre- or perimenopausal women with HR+/HER2- advanced breast cancer. The trial randomized 672 patients to receive endocrine therapy (ET; goserelin plus a nonsteroidal aromatase inhibitor or tamoxifen) with either ribociclib or placebo.

The MONARCH-3 trial evaluated abemaciclib in combination with a nonsteroidal aromatase inhibitor

Endometrial cancer is one of the most prevalent cancer in women and is usually diagnosed in early stages

Overview

Endometrial cancer is the sixth most common neoplasm in women worldwide. In 2006 to 2007, rates varied 10-fold across countries.

Prevalence

Endometrial cancer is categorized into two main types based on histological characteristics: Type I and Type II. Type 1 cancers, primarily endometroid, are more common, accounting for 80% of all endometrial cancers. Type II cancers...

Risk factors

Key risk factors for endometrial cancer include:
- Older age
- Early menarche and late menopause
- Obesity
- Family history of endometrial cancer
- Radiation exposure
- Infertility especially

Symptoms

The most common symptom of endometrial cancer is abnormal uterien bleeding. Other symptoms can include pelvic pain and uterine enlargement.

Generate Question ✏ Edit Prompt ✕

Question

What are the main types of endometrial cancer, their relative prevalence, and the percentage breakdown of the most common histological subtypes?

Answer

Get Answer    Search

COMPRESSION-BASED DATA INSTANCE SEARCH

CROSS REFERENCE TO RELATED APPLICATION(S)

This application is a continuation of U.S. application Ser. No. 18/972,758, filed on Dec. 6, 2024, which claims the benefit of U.S. Provisional Application No. 63/607,714, filed on Dec. 8, 2023, and U.S. Provisional Application No. 63/720,148, filed on Nov. 13, 2024. The contents of those applications are incorporated by reference herein in their entirety for all purposes.

BACKGROUND

In many industries, the rapid growth of unstructured data has presented significant challenges for information management, retrieval, and analysis. Unstructured data, such as textual content found in research articles, technical documents, and legal filings, lacks an inherent organization that facilitates efficient querying or processing. Conventional systems often rely on keyword-based searches or manual curation, which can be time-consuming, imprecise, and computationally expensive, particularly for large datasets.

Advances in machine learning and natural language processing (NLP) have enabled new methods for analyzing and organizing unstructured data. For example, language models can process text to extract semantic meaning, identify relationships among entities, and generate embeddings that represent textual data in a structured format. These techniques, while powerful, still face limitations in scalability, accuracy, and computational efficiency when applied to large-scale datasets or complex queries. Furthermore, the ability to contextualize and cluster related information for efficient retrieval remains a challenge.

Retrieving relevant information from large sets of unstructured data can be particularly time-intensive due to the vast volume and dispersed nature of the information. Systems must process massive datasets to identify and rank results, often leading to delays that hinder real-time decision-making. Additionally, language models used for retrieval and summarization can exhibit hallucination, generating information that appears plausible but is inaccurate or entirely fabricated. This issue undermines trust in the results and necessitates improved mechanisms to ensure that extracted information is both accurate and relevant to the query. As the demand for robust and efficient retrieval systems grows, solutions that address these challenges are increasingly critical.

BRIEF DESCRIPTION OF THE DRAWINGS

FIG. 7A is a conceptual diagram illustrating an example graphical user interface (GUI) that is part of a platform provided by the knowledge management system, in accordance with some embodiments.

FIG. 7B is a conceptual diagram illustrating an example graphical user interface (GUI) that is part of a platform provided by the knowledge management system, in accordance with some embodiments.

FIG. 7C is a conceptual diagram illustrating an example graphical user interface (GUI) that is part of a platform provided by the knowledge management system, in accordance with some embodiments.

FIG. 7D is a conceptual diagram illustrating an example graphical user interface (GUI) that is part of a platform provided by the knowledge management system, in accordance with some embodiments.

Figure 1:
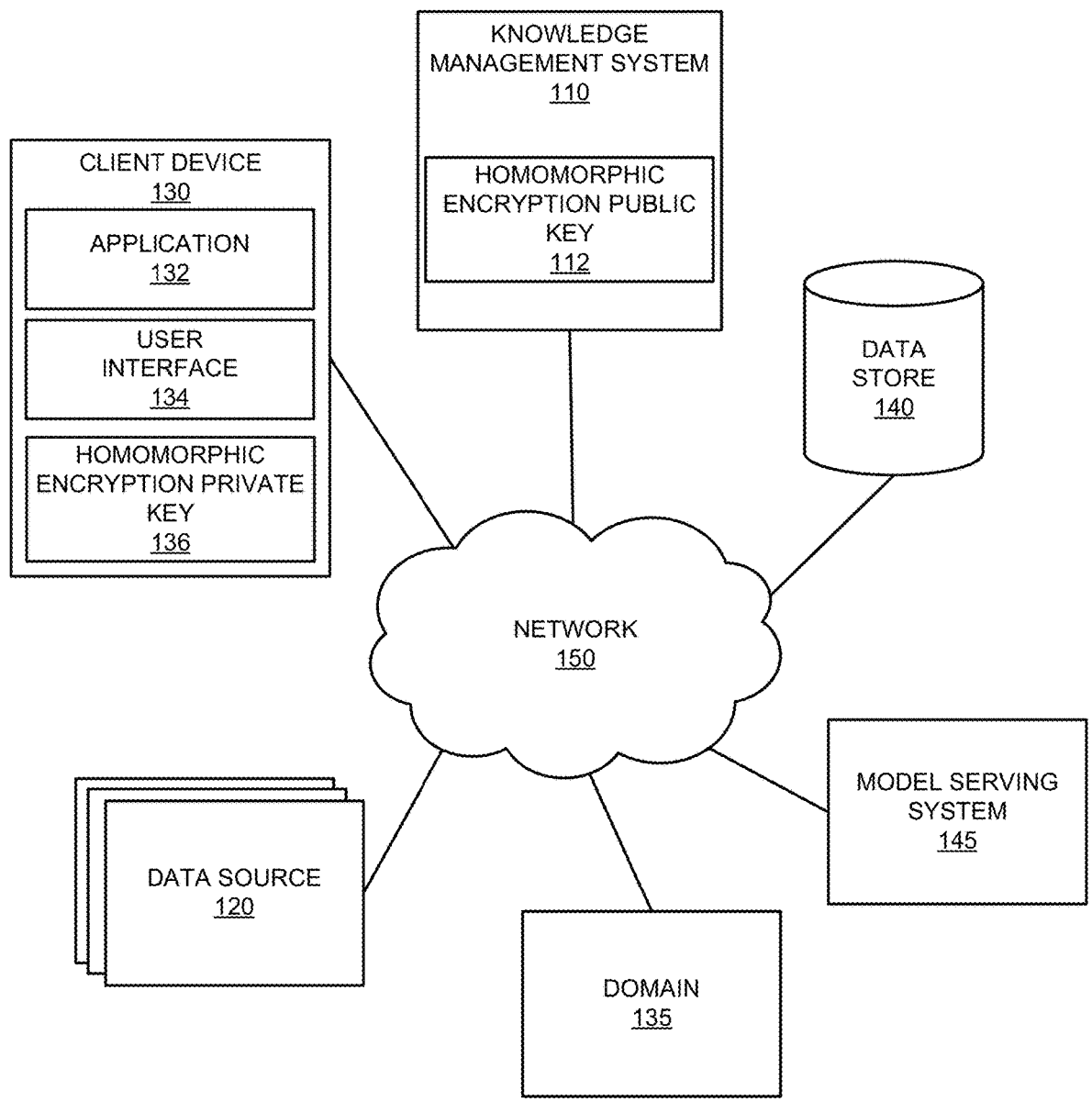
FIG. 1 is a block diagram of an example system environment, in accordance with some embodiments.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The disclosures relate to compression-based vector retrieval and fingerprint generation. A knowledge management system may focus on efficiently processing unstructured data, such as text, images, or audio, by generating compressed representations that facilitate rapid and accurate information retrieval. The knowledge management system ingests data instances and extracts relevant entities using advanced natural language processing (NLP) or other domain-specific models. The extracted entities are converted into high-dimensional vector embeddings, which capture semantic and contextual relationships.

To enable efficient storage and comparison, the knowledge management system uses a compression mechanism that transforms vector embeddings into compact binary fingerprints. A reference embedding is generated by aggregating entity embeddings using statistical measures such as mean, median, or mode. Each value within an entity embedding is compared against corresponding values in the reference embedding, and values are assigned based on whether the entity value exceeds the reference value. The values may be in Boolean, octal, hexadecimal, etc. This results in a fingerprint representation for each entity, consisting of a series of binary values.

These compressed fingerprints drastically reduce the computational overhead associated with traditional vector retrieval methods, enabling fast and scalable comparisons. Fingerprints are particularly well-suited for tasks such as similarity searches and relevance determination, where techniques like Hamming distance can efficiently identify close matches. The fingerprints are stored in optimized memory, such as random-access memory (RAM), to further enhance retrieval speed.

Additionally, the knowledge management system supports query handling by converting user inputs into query embeddings and corresponding fingerprints. These query fingerprints are compared to stored fingerprints to identify relevant matches, with potential applications in knowledge graph construction, entity search, and domain-specific analytics. The knowledge management system provides high efficiency and scalability, making the knowledge management system ideal for data-intensive environments like life sciences, financial analytics, and general-purpose information retrieval.

System Overview

Referring now to Figure (FIG.) 1, shown is a block diagram illustrating an embodiment of an example system environment 100 for data integration and processing, in accordance with some embodiments. By way of example, the system environment 100 includes a knowledge management system 110, data sources 120, client devices 130, an application 132, a user interface 134, a domain 135, a data store 140, and a model serving system 145. The entities and components in the system environment 100 may communicate with each other through network 150. In various embodiments, the system environment 100 may include fewer or additional components. The system environment 100 also may include different components.

The components in the system environment 100 may each correspond to a separate and independent entity or may be controlled by the same entity. For example, in some embodiments, the knowledge management system 110 and an application 132 are operated by the same entity. In some embodiments, the knowledge management system 110 and a model serving system 145 can be operated by different entities.

While each of the components in this disclosure is sometimes described in disclosure in a singular form, the system environment 100 and elsewhere in this disclosure may include one or more of each of the components. For example, there can be multiple client devices 130 that are in communication with the knowledge management system 110. The knowledge management system 110 may also collect data from multiple data sources 120. Likewise, while some of the components are described in a plural form, in some embodiments each of those components may have only a single instance in the system environment 100.

In some embodiments, the knowledge management system 110 integrates knowledge from multiple sources, including research papers, Wikipedia entries, articles, databases, technical documentations, books, legal and regulatory documents, other educational content, and additional data sources such as news articles, social media content, patents and technical documentation. The knowledge management system 110 may also access public databases such as the National Institutes of Health (NIH) repositories, the European Molecular Biology Laboratory (EMBL) database, and the Protein Data Bank (PDB), etc. The knowledge management system 110 employs an architecture that ingests unstructured data, identifies entities in the data, and constructs a knowledge graph that connects various entities. The knowledge graph may include nodes and relationships among the entities to facilitate efficient retrieval.

An entity is any object of potential attention in data. Entities may include a wide range of concepts, data points, named entities, and other entities relevant to a domain of interest. For example, in the domain interest of drug discovery or life science, entities may include medical conditions such as myocardial infarction, sclerosis, diabetes, hypertension, asthma, rheumatoid arthritis, epilepsy, depression, chronic kidney disease, Alzheimer's disease, Parkinson's disease, and psoriasis. Entities may also include any pharmaceutical drugs, such as Ziposia, Aspirin, Metformin, Ibuprofen, Lisinopril, Atorvastatin, Albuterol, Omeprazole, Warfarin, and Amoxicillin. Biomarkers, including inflammatory markers or genetic mutations, are also common entities. Additionally, entities may encompass molecular pathways, such as apoptotic pathways or metabolic cascades. Clinical trial phases, such as Phase I, II, or III trials, may also be identified as entities, alongside adverse events like transient ischemic attacks or cardiac arrhythmias. Furthermore, entities may represent therapeutic interventions, such as radiotherapy or immunotherapy, statistical measures like objective response rates or toxicity levels, and organizations, such as regulatory bodies like the U.S. Food and Drug Administration (FDA) or research institutions. Entities may also include data categories, such as structured data, unstructured text, or vectors, as well as user queries, such as "What are the side effects of [drug]?" or "List all trials for [disease]." In some embodiments, an entity may also be an entire document, a section, a paragraph, or a sentence.

In some embodiments, entities may be extracted from papers and articles, such as research articles, including those indexed in PubMed, ArVix, Nature, Science, The Lancet, and other specific journal references, and other data sources such as clinical trial documents from the FDA. For example, in an unstructured text of a sentence from a research paper, "The study demonstrated that patients with chronic obstructive pulmonary disease (COPD) treated with Salbutamol showed significant improvement in forced expiratory volume (FEV1) after 12 weeks of therapy." In some embodiments, entities in the sentence include "chronic obstructive pulmonary disease," "COPD," "Salbutamol," "forced expiratory volume," "FEV1," and "12 weeks." Abbreviations may first be identified as separate entities but later fused with the entities that represent the long form. Non-entities include terms and phrases such as "the study," "that," "with," "showed," and "after." Details of how the knowledge management system 110 extracts entities from articles will be further discussed in association with FIG. 2. The identities of the articles and authors may also be recorded as entities.

While the examples of knowledge, articles and entities are primarily described in the life science context, the knowledge management system 110 may also manage knowledge in other domains of interest, such as financial analytics, environmental science, materials engineering, and other suitable natural science, social science, and/or engineering fields. In some embodiments, the knowledge management system 110 may also create a knowledge graph of the world knowledge that may include multi-disciplinary domains of knowledge. A set of documents (e.g., articles, papers, documents) that are used to construct a knowledge graph may be referred to as a corpus.

In some embodiments, the entities extracted and managed by the knowledge management system 110 may also be multi-modal, which include entities from text, graphs, images, videos, audios, and other data types. In some embodiments, the entities extracted and managed by the knowledge management system 110 may also be multi-modal, which include entities from text, images, videos, audios, and other data types. Entities extracted from images may include visual features such as molecular structures, histopathological patterns, or annotated graphs in scientific diagrams. The knowledge management system 110 may employ computer vision techniques, such as convolutional neural networks (CNNs), to identify and classify relevant elements within an image, such as detecting specific cell types, tumor regions, or labeled points on a chart. In some embodiments, entities extracted from audio data may include spoken terms, numerical values, or instructions, such as dictated medical notes, research conference discussions, or audio annotations in a study. The knowledge management system 110 may utilize speech-to-text models, combined with entity recognition algorithms, to convert audio signals into structured data while identifying key terms or phrases.

In some embodiments, the knowledge management system 110 may construct a knowledge graph by representing entities as nodes and relationships among the entities as edges. Relationships may be determined in different ways, such as the semantic relationships among entities, proxies of entities appearing in an article (e.g., two entities appearing in the same paragraph or same sentence), transformer multi-head attention determination, co-occurrence of entities across multiple articles or datasets, citation references linking one entity to another, or direct annotations in structured databases. In some embodiments, relationships as edges may also include values that represent the strength of the relationships. For example, the strength of a relationship may be quantified based on the frequency of co-occurrence, cosine similarity of vector representations, statistical correlation derived from experimental data, or confidence scores assigned by a machine learning model. These values allow the knowledge graph to prioritize or rank connections, enabling nuanced analyses such as identifying the most influential entities within a specific domain or filtering weaker, less relevant relationships for focused querying and visualization. Details of how a knowledge graph can be constructed will be further discussed.

In some embodiments, the knowledge management system 110 provides a query engine that allows users to provide prompts (e.g., questions) about various topics. The query engine may leverage both structured data and knowledge graphs to construct responses. Additionally, the knowledge management system 110 supports enhanced user interaction by automatically analyzing the context of user queries and generating related follow-up questions. For example, when a query pertains to a specific topic, the knowledge management system 110 might suggest supplementary questions to refine or deepen the query scope.

In some embodiments, the knowledge management system 110 deconstructs documents into discrete questions and identifies relevant questions for a given article. This process involves breaking the text into logical segments, identifying key information, and formatting the segments as structured questions and responses. The questions identified may be stored as prompts that are relevant to a particular document. As such, each document may be associated with a set of prompts and a corpus of documents may be linked and organized by prompts (e.g., by questions). The prompt-driven data structure enhances the precision of subsequent searches and allows the knowledge management system 110 to retrieve specific and relevant sections instead of entire documents.

In some embodiments, the knowledge management system 110 may incorporate an advanced natural language processing (NLP) model such as language models for understanding and transforming data. The NLP model may be transformers that include encoders only, decoders only, or a combination and encoders and decoders, depending on the use case. In some embodiments, the knowledge management system 110 may support different modes of query execution, including probabilistic or deterministic retrieval methods. Probabilistic retrieval methods may prioritize articles and data segments based on calculated relevance scores, while deterministic methods may focus on explicit matches derived from a predefined structure.

In some embodiments, the knowledge management system 110 may incorporate dynamic visualization tools to represent relationships between extracted entities visually. The system may allow users to navigate through interconnected nodes in a knowledge graph to explore related concepts or data entities interactively. For instance, users could explore links between drugs, diseases, and molecular pathways within a medical knowledge graph.

In various embodiments, the knowledge management system 110 may take different suitable forms. For example, while the knowledge management system 110 is described in a singular form, the knowledge management system 110 may include one or more computers that operate independently, cooperatively, and/or distributively (i.e., in a distributed manner). The knowledge management system 110 may be operated by one or more computing devices. The one or more computing devices includes one or more processors and memory configured to store executive instructions. The instructions, when executed by one or more processors, cause the one or more processors to perform omics data management processes that centrally manage the raw omics datasets received from one or more data sources.

By way of examples, in various embodiments, the knowledge management system 110 may be a single server or a distributed system of servers that function collaboratively. In some embodiments, the knowledge management system 110 may be implemented as a cloud-based service, a local server, or a hybrid system in both local and cloud environments. In some embodiments, the knowledge management system 110 may be a server computer that includes one or more processors and memory that stores code instructions that are executed by one or more processors to perform various processes described herein. In some embodiments, the knowledge management system 110 may also be referred to as a computing device or a computing server. In some embodiments, the knowledge management system 110 may be a pool of computing devices that may be located at the same geographical location (e.g., a server room) or be distributed geographically (e.g., cloud computing, distributed computing, or in a virtual server network). In some embodiments, the knowledge management system 110 may be a collection of servers that independently, cooperatively, and/or distributively provide various products and services described in this disclosure. The knowledge management system 110 may also include one or more virtualization instances such as a container, a virtual machine, a virtual private server, a virtual kernel, or another suitable virtualization instance.

In some embodiments, data sources 120 include various repositories of textual and numerical information that are used for entity extraction, retrieval, and knowledge graph construction. The data sources 120 may include publicly accessible datasets, such as Wikipedia or PubMed, and proprietary datasets containing confidential or domain-specific information. A data source 120 may be a data source that contains research papers, including those indexed in PubMed, ArVix, Nature, Science, The Lancet, and other specific journal references, and other data sources such as clinical trial documents from the FDA. The datasets may be structured, semi-structured, or unstructured, encompassing formats such as articles in textual documents, JSON files, relational databases, or real-time data streams. The knowledge management system 110 may control one or more data sources 120 but may also use public data sources 120 and/or license documents from private data sources 120.

In some embodiments, the data sources 120 may incorporate multiple formats to accommodate diverse use cases. For instance, the data sources 120 may include full-text articles, abstracts, or curated datasets. These datasets may vary in granularity, ranging from detailed, sentence-level annotations to broader, document-level metadata. In some embodiments, the data sources 120 may support dynamic updates to ensure that the knowledge graph remains current. Real-time feeds from online databases or APIs can be incorporated into the data sources 120. In some embodiments, permissions and access controls may be applied to the data sources 120, restricting certain datasets to authorized users while maintaining public accessibility for others. In some embodiments, the knowledge management system 110 may be associated with a certain level of access privilege to a particular data source 120. In some embodiments, the access privilege may also be specific to a customer of the knowledge management system 110. For example, a customer may have access to some data sources 120 but not other data sources 120. In some embodiments, the data sources 120 may be extended with domain-specific augmentations. For example, in life sciences, data sources 120 may include ontologies describing molecular pathways, clinical trial datasets, and regulatory guidelines.

In some embodiments, various data sources 120 may be geographically distributed in different locations and manners. In some embodiments, data sources 120 may store data in public cloud providers, such as AMAZON WEB SERVICES (AWS), AZURE, and GOOGLE Cloud. The knowledge management system 110 may access and download data from data sources 120 on the Cloud. In some embodiments, a data source 120 may be a local server of the knowledge management system 110.

In some embodiments, a data source 120 may be provided by a client organization of the knowledge management system 110 and serve as the client specific data source that can be integrated with other public data sources 120. For example, a client specific knowledge graph can be generated and be integrated with a large knowledge graph maintained by the knowledge management system 110. As such, the client may have its own specific knowledge graph that may have elements of specific domain ontology, and the client may expand its research because the client specific knowledge graph portion is linked to a larger knowledge graph.

In some embodiments, the client device 130 is a user device that interacts with the knowledge management system 110. The client device 130 allows users to access, query, and interact with the knowledge management system 110 to retrieve, input, or analyze knowledge and information stored within the system. For example, a user may query the knowledge management system 110 to receive responses of prompts and extract specific entities, relationships or data points relevant to a particular topic of interest. Users may also upload new data, annotate existing information, or modify knowledge graph structures within the knowledge management system 110. Additionally, users can execute complex searches to explore relationships between entities, generate visualizations such as charts or graphs, or initiate simulations based on retrieved data. These capabilities enable users to utilize the knowledge management system 110 for tasks such as research, decision-making, drug discovery, clinical studies, or data analysis across various domains.

A client device 130 may be an electronic device controlled by a user who interacts with the knowledge management system 110. In some embodiments, a client device 130 may be any electronic device capable of processing and displaying data. These devices may include, but are not limited to, personal computers, laptops, smartphones, tablet devices, or smartwatches.

In some embodiments, an application 132 is a software application that serves as a client-facing frontend for the knowledge management system 110. An application 132 can provide a graphical or interactive interface through which users interact with the knowledge management system 110 to access, query, or modify stored information. An application 132 may offer features such as advanced search capabilities, data visualization, query builders and storage, or tools for annotating and editing knowledge and relationships. These features may allow users to efficiently navigate through complex datasets and extract meaningful insights. Users can interact with the application 132 to perform a wide range of tasks, such as submitting queries to retrieve specific data points or exploring relationships between knowledge. Additionally, users can upload new datasets, validate extracted entities, or customize data visualizations to suit the users' analytical needs. An application 132 may also facilitate the management of user accounts, permissions, and secure data access.

In some embodiments, a user interface 134 may be the interface of the application 132 and allow the user to perform various actions associated with application 132. For example, application 132 may be a software application, and the user interface 134 may be the front end. The user interface 134 may take different forms. In some embodiments, the user interface 134 is a graphical user interface (GUI) of a software application. In some embodiments, the front-end software application 132 is a software application that can be downloaded and installed on a client device 130 via, for example, an application store (App store) of the client device 130. In some embodiments, the front-end software application 132 takes the form of a webpage interface that allows users to perform actions through web browsers. A front-end software application includes a GUI 134 that displays various information and graphical elements. In some embodiments, the GUI may be the web interface of a software-as-a-service (SaaS) platform that is rendered by a web browser. In some embodiments, user interface 134 does not include graphical elements but communicates with a server or a node via other suitable ways, such as command windows or application program interfaces (APIs).

In some embodiments, the application 132 may be a client-side application 132 that is locally hosted in a client device 130. In such arrangement, the client-side application 132 may be used to handle confidential data belonging to an organization domain, as further discussed in FIG. 6. In some embodiment, a client device 130 may possess a homomorphic encryption private key 136 and a homomorphic encryption public key 112. The homomorphic encryption private key 136 allows the client device 130 to decrypt encrypted documents that has been processed and returned by the knowledge management system 110. For example, encrypted documents, fingerprints, or query results can be securely transmitted to the client device 130 and decrypted locally using the private key.

In some embodiments, the homomorphic encryption private key 136 may be managed by a client-side application 132, which may be responsible for executing decryption operations and ensuring the confidentiality of the decrypted data. The client-side application 132 may also enforce access controls, logging, and other security measures to prevent unauthorized use of the private key. Additionally, the homomorphic encryption allows the knowledge management system 110 in communication with the client device 130 to perform computations on encrypted data without exposing plaintext, preserving the integrity of sensitive information even during analysis. In some embodiments, the knowledge management system 110 may also possess a homomorphic encryption public key 112. Depending on the type of homomorphic encryption scheme, the knowledge management system 110 may use the homomorphic encryption public key 112 to encrypt data that can only be decrypted by the homomorphic encryption private key 136 and/or to use the homomorphic encryption private key 136 for comparison of encrypted fingerprints.

In some embodiments, the knowledge management system 110 may integrate public knowledge to domain knowledge specific to a particular domain 135. For example, a company client can request the knowledge management system 110 to integrate the client's domain knowledge to other knowledge available to the knowledge management system 110. A domain 135 refers to an environment for a group of units and individuals to operate and to use domain knowledge to organize activities, information and entities related to the domain 135 in a specific way. An example of a domain 135 is an organization, such as a pharmaceutical company, a biotech company, a business, a research institute, or a subpart thereof and the data within it. A domain 135 can be associated with a specific domain knowledge ontology, which could include representations, naming, definitions of categories, properties, logics, and relationships among various omics data that are related to the research projects conducted within the domain. The boundary of a domain 135 may not completely overlap with the boundary of an organization. For example, a domain may be a research team within a company. In other situations, various research groups and institutes may share the same domain 135 for conducting a collaborative project.

One or more data stores 140 may be used to store various data used in the system environment 100, such as various entities, entity representations, and knowledge graph. In some embodiments, data stores 140 may be integrated with the knowledge management system 110 to allow data flow between storage and analysis components. In some embodiments, the knowledge management system 110 may control one or more data stores 140.

In some embodiments, one of the data stores 140 may be used to store confidential data of an organization domain 135. For example, a domain 135 may include encrypted documents that correspond to unencrypted documents. The documents may be encrypted using a homomorphic encryption public key 112. The encrypted documents may be stored in a data store 140 to preserve confidentiality of the data within the documents. Using process 600 that will be discussed in FIG. 6, the knowledge management system 110 may perform query of the encrypted documents without processing any of the information in plaintext, thereby preserving the security and confidentiality of the documents.

A data store 140 includes one or more storage units, such as memory, that take the form of a non-transitory and non-volatile computer storage medium to store various data. The computer-readable storage medium is a medium that does not include a transitory medium, such as a propagating signal or a carrier wave. In one embodiment, the data store 140 communicates with other components by a network 150. This type of data store 140 may be referred to as a cloud storage server. Examples of cloud storage service providers may include AMAZON AWS, DROPBOX, RACKSPACE CLOUD FILES, AZURE, GOOGLE CLOUD STORAGE, etc. In some embodiments, instead of a cloud storage server, a data store 140 may be a storage device that is controlled and connected to a server, such as the knowledge management system 110. For example, the data store 140 may take the form of memory (e.g., hard drives, flash memory, discs, ROMs, etc.) used by the server, such as storage devices in a storage server room that is operated by the server. The data store 140 might also support various data storage architectures, including block storage, object storage, or file storage systems. Additionally, it may include features like redundancy, data replication, and automated backup to ensure data integrity and availability. A data store 140 can be a database, data warehouse, data lake, etc.

A model serving system 145 is a system that provides machine learning models. The model serving system 145 may receive requests from the knowledge management system 110 to perform tasks using machine learning models. The tasks may include, but are not limited to, natural language processing (NLP) tasks, audio processing tasks, image processing tasks, video processing tasks, etc. In some embodiments, the machine learning models deployed by the model serving system 145 are models that are originally trained to perform one or more NLP tasks but are fine-tuned for other specific tasks. The NLP tasks include, but are not limited to, text generation, context determination, query processing, machine translation, chatbots, and the like.

The machine learning models served by the model serving system 145 may take different model structures. In some embodiments, one or more models are configured to have a transformer neural network architecture. Specifically, the transformer model is coupled to receive sequential data tokenized into a sequence of input tokens and generates a sequence of output tokens depending on the task to be performed. Transformer models are examples of language models that may or may not be auto-regressive.

In some embodiments, the language models are large language models (LLMs) that are trained on a large corpus of training data to generate outputs. An LLM may be trained on massive amounts of training data, often involving billions of words or text units, and may be fine-tuned by domain specific training data. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters. In some embodiments, some of the language models used in this disclosure are smaller language models that are optimized for accuracy and speed.

Since an LLM has a significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a Cloud infrastructure service. The LLM may be pre-trained by the model serving system 145. In some embodiments, the LLM may also be fine-tuned by the model serving system 145 or by the knowledge management system 110.

In some embodiments, when the machine learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations. In some embodiments, the transformer models used by the knowledge management system 110 to encode entities are encoder only models. In some embodiments, a transformer model may include encoders only, decoders only, or a combination of encoders and decoders.

While an LLM with specific layer architecture is described as an example in this disclosure, the language model can be configured as any other appropriate architecture including, but not limited to, recurrent neural network (RNN), long short-term memory (LSTM) networks, Markov networks, Bidirectional Encoder Representations from Transformers (BERT), generative-adversarial networks (GAN), diffusion models (e.g., Diffusion-LM), linear RNN such as MAMBA, and the like. A machine learning model may be implemented using any suitable software package, such as PyTorch, TensorFlow, Mamba, Keras, etc.

In various embodiments, the model serving system 145 may or may not be operated by the knowledge management system 110. In some embodiments, the model serving system 145 is a sub-server or a sub-module of the knowledge management system 110 for hosting one or more machine learning models. In such cases, the knowledge management system 110 is considered to be hosting and operating one or more machine learning models. In some embodiments, a model serving system 145 is operated by a third party such as a model developer that provides access to one or more models through API access for inference and fine-tuning. For example, the model serving system 145 may be provided by a frontier model developer that trains a large language model that is available for the knowledge management system 110 to be fine-tuned to be used.

The communications among the knowledge management system 110, data sources 120, client device 130, application 132, data store 140, and the model serving system 145 may be transmitted via a network 150. In some situations, a network 150 may be a local network. In some situations, a network 150 may be a public network such as the Internet. In one embodiment, the network 150 uses standard communications technologies and/or protocols. Thus, the network 150 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 can be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 150 also includes links and packet-switching networks such as the Internet.

Example Knowledge Management System

Figure 2:
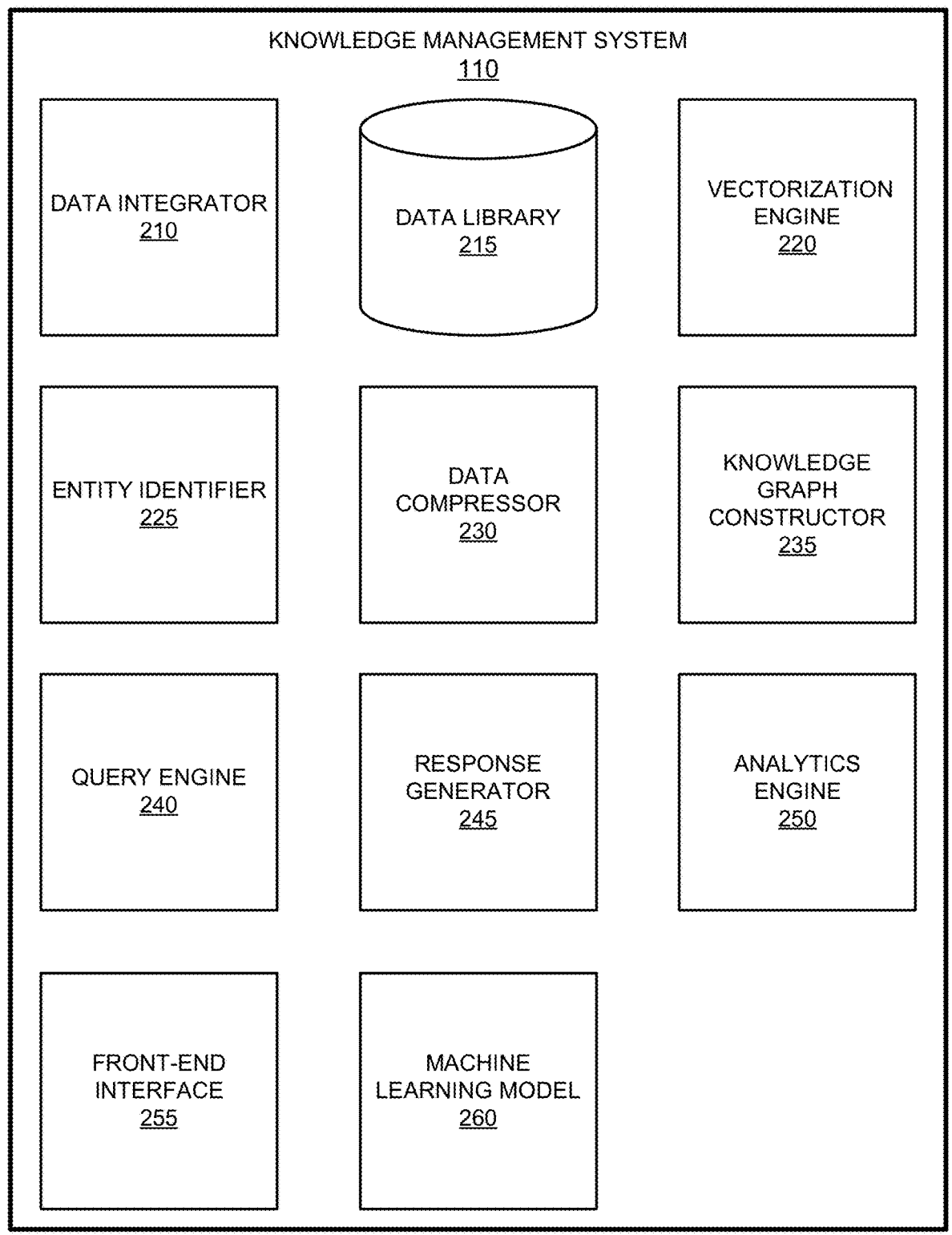
FIG. 2 is a block diagram illustrating various components of an example knowledge management system, in accordance with some embodiments.

FIG. 2 is a block diagram illustrating various components of an example knowledge management system 110, in accordance with some embodiments. A knowledge management system 110 may include data integrator 210, data library 215, vectorization engine 220, entity identifier 225, data compressor engine 230, knowledge graph constructor 235, query engine 240, response generator 245, analytics engine 250, front-end interface 255, and machine learning model 260. In various embodiments, the knowledge management system 110 may include fewer or additional components. The knowledge management system 110 also may include different components. The functions of various components in knowledge management system 110 may be distributed in a different manner than described below. Moreover, while each of the components in FIG. 2 may be described in a singular form, the components may present in plurality.

In some embodiments, the data integrator 210 is configured to receive and integrate data from various data sources 120 into the knowledge management system 110. The data integrator 210 ingests structured, semi-structured, and unstructured data, including text, images, and numerical datasets. The data received may include research papers, clinical trial documents, technical specifications, and regulatory filings. For instance, the data sources 120 may comprise public databases like PubMed, private databases that knowledge management system 110 licenses, and proprietary datasets from client organizations. In some embodiments, the data integrator 210 employs various methods to parse and process the received data. For example, textual documents may be tokenized and segmented into manageable components such as paragraphs or sentences. Similarly, metadata associated with these documents, such as publication dates, authors, or research affiliations, is extracted and standardized.

In some embodiments, the data integrator 210 may support multiple formats and modalities of data. For instance, the received data may include textual documents in formats such as plain text, JSON, XML, and PDF. Images, such as diagrams, charts, or annotated medical images, may be provided in formats like PNG, JPEG, or TIFF. Numerical datasets may arrive in tabular formats, including CSV or Excel files. Audio data, such as recorded conference discussions, may also be processed through transcription systems. In some embodiments, the data integrator 210 may accommodate domain-specific data requirements by integrating specialized ontologies. For example, life sciences datasets may include structured ontologies describing molecular pathways, biomarkers, and clinical trial metadata. The data integrator 210 may also incorporate custom data parsing rules to handle these domain-specific data types effectively.

In some embodiments, the data library 215 stores and manages various types of data utilized by the knowledge management system 110. The data library 215 can be part of one or more data stores that store raw documents, tokenized entities, knowledge graphs, extracted prompts, and client prompt histories. Those kinds of data can be stored in a single data store or different data stores. The stored data may include unprocessed documents, processed metadata, and structured representations such as vectors and entity relationships.

In some embodiments, the data library 215 may support the storage of tokenized entities extracted from raw documents. These entities may include concepts such as diseases, drugs, molecular pathways, biomarkers, and clinical trial phases. The data library 215 may also manage knowledge graphs constructed from these entities, including relationships and metadata for subsequent querying and analysis. Additionally, the data library 215 may store client-specific prompts and the historical interactions associated with those prompts. This historical data allows the knowledge management system 110 to refine its retrieval and analysis processes based on user-specific preferences and past queries.

In some embodiments, the data library 215 may support multimodal data storage, enabling the integration of text, images, audio, and video data. For example, images such as molecular diagrams or histopathological slides may be stored alongside textual descriptions, while audio recordings of discussions may be transcribed and stored as searchable text. This multimodal capability allows the data library 215 to serve a wide range of domain-specific use cases, such as medical diagnostics or pharmaceutical research.

In some embodiments, the data library 215 may use a customized indexing and caching mechanisms to optimize data retrieval. In some embodiments, the entities in knowledge graphs may be represented as fingerprints that are N-bit integers (e.g., 32-bit, 64-bit, 128-bit, 256-bit). The fingerprints may be stored in fast memory hardware such as the random-access memory (RAM) and the corresponding documents may be stored in hard drives such as solid-state drives. This storage structure allows a knowledge graph and relationship among the entities to be stored in RAM and can be analyzed quickly. The knowledge management system 110 may then retrieve the underlying documents on demand from the hard drives.

The data can be stored in structured formats such as relational databases or unstructured data stores such as data lakes. In different embodiments, various data storage architectures may be used, like cloud-based storage, local servers, or hybrid systems, to ensure flexibility in data access and scalability. The data library 215 may include features for data redundancy, automated backup, and encryption to maintain data integrity and security. The data library 215 may take the form of a database, data warehouse, data lake, distributed storage system, cloud storage platform, file-based storage system, object storage, graph database, time-series database, or in-memory database, etc. The data library 215 allows the knowledge management system 110 to process large datasets efficiently while ensuring data reliability.

In some embodiments, the vectorization engine 220 is configured to convert natural-language text into embedding vectors or simply referred to as embeddings. An embedding vector is a latent vector that represents text, mapped from the latent space of a neural network of a high-dimensional space (often exceeding 10 dimensions, such as 16 dimensions, 32 dimensions, 64 dimensions, 128 dimensions, or 256 dimensions). The embedding vector captures semantic and contextual information of the text, preserving relationships between words or phrases in a dense, compact format suitable for computational tasks. The vectorization engine 220 processes input text by analyzing its syntactic and semantic features. For instance, given a textual input such as "heart attack," the vectorization engine 220 generates a multi-dimensional latent space that encodes contextual information, such as the text's association with medical conditions, treatments, or outcomes. For example, the embedding vector for "myocardial infarction" may closely align with that of "heart attack" in the high-dimensional space, reflecting the text's semantic relevancy. The embeddings can be used for a variety of downstream tasks, such as information retrieval, classification, clustering, and query generation.

In some embodiments, the vectorization engine 220 may generate embedding vectors using various methods and models. The vectorization engine 220 may use an encoder-only transformer that is trained by the knowledge management system 110. In some embodiments, the vectorization engine 220 may use Bidirectional Encoder Representations from Transformers (BERT), which processes the input text to generate context-sensitive embedding vectors. Various transformer models may leverage self-attention mechanisms to understand relationships between words within a sentence or passage. Another method is Word2Vec, which generates word embeddings by analyzing large corpora of text to predict word co-occurrence, representing words as vectors in a latent space where semantically similar words are mapped closer together. Principal Component Analysis (PCA) may also be used to reduce the dimensionality of text features while retaining the most significant patterns, creating lower-dimensional embeddings useful for clustering or visualization. Semantic analysis models, such as Latent Semantic Analysis (LSA) or Latent Dirichlet Allocation (LDA), create embeddings by identifying latent topics or themes in text, which are then represented as vectors in a thematic space. Sentence embedding models, such as Sentence-BERT or Universal Sentence Encoder, produce sentence-level embeddings by capturing the overall semantic meaning of an entire sentence or paragraph. Text embeddings may also be derived from term frequency-inverse document frequency (TF-IDF) matrices, further refined using dimensionality reduction techniques like singular value decomposition (SVD). Neural networks designed for unsupervised learning, such as autoencoders, may also compress text representations into embeddings by encoding input text into a latent space and decoding the text to embeddings. The vectorization engine 220 may also support multi-modal embeddings, such as combining textual features with numerical or visual data to generate richer representations suitable for diverse applications. In some embodiments, the vectorization engine 220 may also encode images and audios into embeddings.

In some embodiments, the entity identifier 225 may receive embeddings from the vectorization engine 220 and determine whether the embeddings correspond to entities of interest within the knowledge management system 110. The embeddings represent data points or features derived from diverse datasets, including text, numerical records, or multi-modal content. The entity identifier 225 evaluates the embeddings using various classification techniques to determine whether the embeddings are entities or non-entities.

In some embodiments, the entity identifier 225 applies multi-target binary classification to assess embeddings. This method enables the simultaneous identification of multiple entities within a single dataset. For instance, when processing embeddings derived from a document, the entity identifier 225 may determine whether an entity candidate is one or more of a set of targets, such as drugs, diseases, biomarkers, or clinical outcomes. Each determination with respect to a target may be a binary classification (true or false). Hence, each entity candidate may be represented as a vector of binary values. The binary vector may be further analyzed such as by inputting the binary vectors of various entity candidates to a classifier (e.g., a neural network) to determine whether an entity candidate is in fact an entity. In some classifiers, the classifier may also determine the type of entity.

In some embodiments, the entity identifier 225 may also use language models (LLMs) to evaluate embeddings in context. For example, the entity identifier 225 may use transformer-based LLMs to assess whether an embedding aligns with known entities in predefined ontologies to determine whether an entity candidate is in fact an entity. This process may include interpreting relationships and co-occurrences within the original dataset to ensure accurate identification. The entity identifier 225 may also support iterative evaluation, refining entity assignments based on contextual cues and cross-referencing results with existing knowledge graphs. In some embodiments, the entity identifier 225 may integrate probabilistic methods alongside deterministic rules to account for uncertainty in entity classification. For example, embeddings with a high probability of matching multiple entity types may be flagged for manual review or additional processing. This hybrid approach ensures flexibility and robustness in managing ambiguous cases.

In some embodiments, the entity identifier 225 may support customizable classification rules tailored to specific domains. For example, in a pharmaceutical application, the entity identifier 225 may be configured to identify embeddings related to adverse events, therapeutic classes, or molecular interactions. Domain-specific ontologies can further enhance the classification process by providing context-sensitive criteria for identifying entities.

In some embodiments, the entity identifier 225 leverages embeddings from multiple language models, including both encoder-only models and encoder-decoder models. The embeddings may capture complementary perspectives on the data, enhancing the precision of entity identification. Additionally, the entity identifier 225 may utilize clustering techniques to group similar embeddings before classification to improve the classification.

In some embodiments, the data compressor 230 is configured to reduce the size and complexity of data representations within the knowledge management system 110 while retaining essential information for analysis and retrieval. The data compressor 230 processes embeddings and entities and uses various compression techniques to improve efficient storage, retrieval, and computation.

In some embodiments, the data compressor 230 may employ various compression techniques tailored to the nature of the data and the operational requirements. For instance, lossy compression techniques, such as quantization, may reduce embedding precision to smaller numerical ranges, enabling faster computation at the expense of slight accuracy reductions. In contrast, lossless methods, such as dictionary-based encoding, may retain exact values for applications requiring high fidelity. In some embodiments, embeddings may be compressed using clustering techniques, where similar embeddings are grouped together, and representative centroids replace individual embeddings.

In some embodiments, the data compressor 230 may implement compression schemes for multi-modal data. For example, embeddings derived from images, audio, or video can be compressed using convolutional or recurrent neural network architectures. These models create compact, domain-specific representations that integrate with embeddings from textual data, enabling cross-modal comparisons.

In some embodiments, the data compressor 230 is configured to receive a corpus of data, where the corpus may include a variety of data types, such as text, articles, images, audio recordings, or other suitable data formats. The data compressor 230 processes these entities by converting them into compact representations, referred to as entity fingerprints, that enable efficient storage and retrieval.

In some embodiments, the data compressor 230 aggregates the plurality of embedding vectors corresponding to entities into a reference vector. The reference vector may have the same dimensionality as each of the individual embedding vectors. Each embedding vector is then compared to the reference vector, value by value. Based on the comparison, the data compressor 230 assigns a Boolean value to each element in the embedding vector. For example, if the value of an element in the embedding vector exceeds the corresponding value in the reference vector, a Boolean value of "1" may be assigned; otherwise, a "0" may be assigned.

In some embodiments, the data compressor 230 converts each embedding vector into an entity Boolean vector based on the assigned Boolean values. Optionally, the entity Boolean vector may be further converted into an entity integer. The integer represents a compact numerical encoding of the Boolean vector. The resulting entity Boolean vector or entity integer is stored as an entity fingerprint. These fingerprints provide a compressed yet distinguishable representation for each entity in the corpus, facilitating efficient storage and retrieval operations.

Figure 5A:
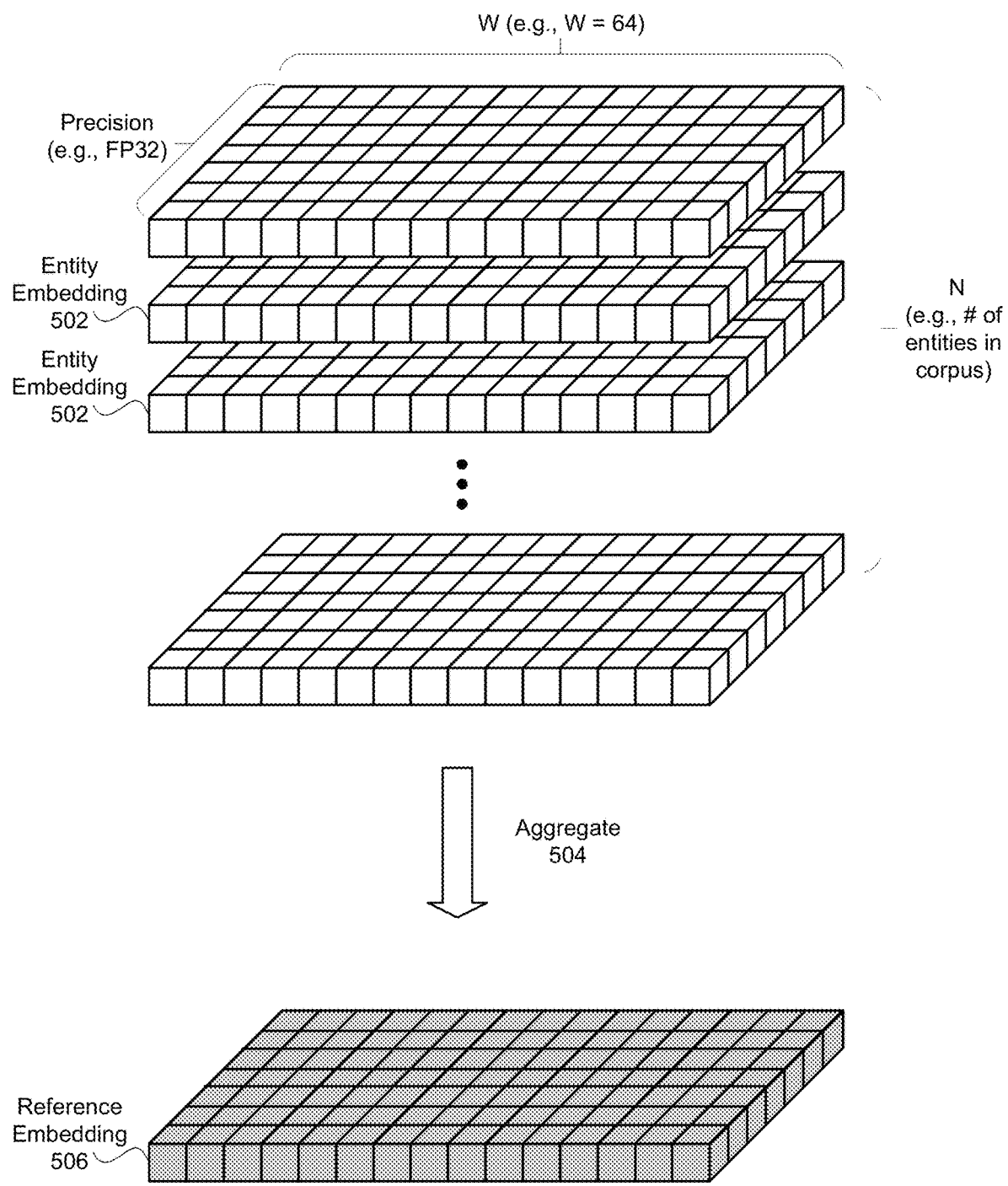
FIG. 5A is a conceptual diagram illustrating the generation of a reference embedding, in accordance with some embodiments.

Further details on the operation of the data compressor 230 are described in FIG. 5A.

In some embodiments, the knowledge graph constructor 235 is configured to generate a structured representation of entities and their relationships as a knowledge graph within the knowledge management system 110. The knowledge graph represents entities as nodes and their interconnections as edges, capturing semantic, syntactic, or contextual relationships between the entities. For example, entities such as "myocardial infarction" and "hypertension" might be linked based on their co-occurrence in medical literature or a direct causal relationship derived from clinical data.

In some embodiments, the knowledge graph constructor 235 constructs one or more knowledge graphs as a data structure of the entities extracted from unstructured text so that the corpus of unstructured text is connected in a data structure. The knowledge graph constructor 235 may derive relationships of entities, such as co-occurrence of entities in text, degree of proximity in the text (e.g., in the same sentence, in the same paragraph), explicit annotations in structured datasets, citation in the text, and statistical correlations from numerical data. The relationships may include diverse types, such as hierarchical, associative, or causal. For instance, relationships can indicate hierarchical inclusion (e.g., "disease" includes "cardiovascular disease"), co-occurrence (e.g., "clinical trial" and "drug A"), or interaction (e.g., "gene A" regulates "protein B"). The knowledge graph constructor 235 may also determine node assignment based on the type of entities, such as drugs, indications, diseases, biomarkers, or clinical outcomes. The node assignment may correspond to the targets in multi-target binary classification.

In some embodiments, the knowledge graph constructor 235 may also perform node fusion to consolidate duplicate or equivalent entities. For instance, if two datasets reference the same entity under different names, such as "multiple sclerosis" and "MS," the knowledge graph constructor 235 identifies these entities as equivalent through multiple methodologies. The knowledge graph constructor 235 may use various suitable techniques to fuse entities, including direct text matching, where exact or normalized matches are identified, such as ignoring case sensitivity (e.g., "MS" and "ms") or stripping irrelevant symbols (e.g., "multiple sclerosis" and "multiple-sclerosis"). The knowledge graph constructor 235 may also use embedding similarity where the knowledge graph constructor 235 evaluates the embedding proximity in a latent space using measures like cosine similarity. For example, embeddings for "MS," "multiple sclerosis," and related terms like "disseminated sclerosis" or "encephalomyelitis disseminata" would cluster closely. In some embodiments, the knowledge graph constructor 235 may employ domain-specific synonym dictionaries or ontologies to further refine the fusion process. For instance, a medical ontology might explicitly link "Transient Ischemic Attack" and "TIA," or annotate abbreviations and full terms to facilitate accurate merging. The fusion process may also incorporate techniques like stripping irrelevant prefixes or suffixes, harmonizing abbreviations, or leveraging standardized data formats from domain-specific databases.

The knowledge graph constructor 235 may also analyze contextual data from source documents to confirm equivalence. For example, if two entities share identical relationships with surrounding nodes—such as being associated with the same drugs, biomarkers, or clinical trials—this relational context strengthens the likelihood of equivalence. In some embodiments, the knowledge graph constructor 235 applies multi-step refinement for node fusion. This may include probabilistic scoring, where potential matches are assigned confidence scores based on the strength of text similarity, embedding proximity, or co-occurrence frequency. In some embodiments, the matches exceeding a predefined threshold are fused. In some embodiments, the knowledge graph constructor 235 may also use a transformer language model to determine whether two entities should be fused.

In some embodiments, each document in a corpus may be converted into a knowledge graph and the knowledge graphs of various documents may be combined by fusing the same nodes. For example, two research articles may be related to different research, but both are related to an indication. The knowledge graph constructor 235 may merge the two knowledge graphs together through the node representing the indication. After multiple knowledge graphs are merged, an overall knowledge graph representing the knowledge of the corpus may be generated and stored as the data structure and relationships among the unstructured data in the corpus.

In some embodiments, the knowledge graph constructor 235 generates and stores the knowledge graph as a structured data format, such as JSON, RDF, or a graph database schema. Each node may represent an entity embedding and may contain attributes such as entity type, name, and source information. Edges may represent the relationships among the nodes and may be enriched with metadata, such as the type of relationship, frequency of interaction, or confidence scores. Each edge may also be associated with a value to represent the strength of a relationship.

In some embodiments, the knowledge graph constructor 235 may extract questions from textual and structured data and transform the extracted questions into entities within the knowledge graph. The process involves parsing source documents, such as research papers, clinical trial records, or technical articles, and identifying logical segments of text that can be reformulated as discrete questions. For example, a passage discussing the side effects of a drug might yield a question like, "What are the side effects of [drug name]?" Similarly, descriptions of study results may produce questions such as, "What is the efficacy rate of [treatment] for [condition]?"

In some embodiments, the extraction of questions leverages language models, such as encoder-only or encoder-decoder transformers, to process textual data. The knowledge graph constructor 235 may use language models to analyze text at the sentence or paragraph level, identify key information, and format the key information into structured questions. The questions may represent prompts or queries relevant to the associated document and may serve as bridges between unstructured data and structured query responses.

In some embodiments, the knowledge graph constructor 235 stores the extracted questions as entities in the knowledge graph. For example, a question entity like "What are the biomarkers for Alzheimer's disease?" may be linked to related entities, such as specific biomarkers, clinical trial phases, or research publications. In some embodiments, the knowledge graph constructor 235 clusters related questions into hierarchical or thematic groups in the knowledge graph. For instance, questions about "biomarkers" may form a cluster linked to higher-level topics such as "diagnostic tools" or "disease mechanisms." This clustering facilitates efficient storage and retrieval, enabling users to navigate the knowledge graph through interconnected questions.

In some embodiments, the query engine 240 is configured to process user queries and retrieve relevant information from the knowledge graph stored within the knowledge management system 110. The query engine 240 interprets user inputs, formulates database queries, and executes these queries to return structured results. User inputs may range from natural language questions, such as "What are the approved treatments for multiple sclerosis?" to more complex analytical prompts, such as "Generate a bar chart of objective response rates for phase 2 clinical trials."

Based on the knowledge graph, the query engine 240 locates specific nodes or edges relevant to the query. The query engine 240 may convert the user query (e.g., user prompt) into embedding and entities, using vectorization engine 220, entity identifier 225, and data compressor 230. In response to a user query for "drug efficacy," the query engine 240 identifies nodes representing drugs and edges that denote relationships with efficacy metrics. Based on the entities identified in the query, the query engine 240 uses the knowledge graph to determine related entities in the knowledge graph. The searching of related entities may be based on the relationships and positions of nodes in the knowledge graph of a corpus. Alternatively, or additionally, the searching of related entities may also be based on the compressed fingerprints of the entities generated by the data compressor 230. For example, the query engine 240 may determine the Hamming distances between the entity fingerprints in the query and the entity fingerprints in the knowledge graph to identify closely relevant entities. Alternatively, or additionally, the searching of related entities may also be based on the result of the analysis of a language model.

Upon identifying the relevant entities by the query engine 240 in response to a query, a response generator 245 may generate a response to the query. The response generator 245 processes the retrieved data and formats the data into output that is aligned with the query context. The response generated may take various forms, including natural language text, graphical visualizations, tabular data, or links to underlying documents.

In some embodiments, the response generator 245 utilizes a transformer-based model, such as a decoder-only language model, to generate a response. The response may be in the form of a natural-language text or may be in a structured format. For example, when the query pertains to drug efficacy rates for a specific treatment, the response generator 245 may retrieve relevant numerical data and format the data into a table. Similarly, if the query involves identifying relationships between diseases and molecular pathways, the response generator 245 may construct and present a graphical visualization illustrating the interconnected entities.

In some embodiments, the response generator 245 supports multi-modal outputs by integrating data from text, images, and metadata. For instance, the response generator 245 may include visual annotations on medical images or charts, provide direct links to sections of research papers, or generate textual summaries of retrieved data points. The response generator 245 also allows for customizable output formats, enabling users to specify the desired structure, such as bulleted lists, detailed reports, or concise summaries.

In some embodiments, the response generator 245 may leverage contextual understanding to adapt responses to the complexity and specificity of a query. For example, a query requesting a high-level overview of clinical trials may prompt the response generator 245 to produce a summarized textual response, while a more detailed query may lead to the generation of comprehensive tabular data including trial phases, participant demographics, and outcomes.

In some embodiments, the analytics engine 250 is configured to generate various forms of analytics based on data retrieved and processed by the knowledge management system 110. The analytics engine 250 uses knowledge graphs and integrated datasets to provide users with actionable insights, predictive simulations, and structured reports. These analytics may include descriptive, diagnostic, predictive, and prescriptive insights tailored to specific user queries or research goals.

In some embodiments, the analytics engine 250 performs advanced data analysis by leveraging machine learning models and statistical techniques. For example, the analytics engine 250 may predict outcomes such as drug efficacy or potential adverse effects by analyzing data trends within clinical trial results. Additionally, the analytics engine 250 supports hypothesis generation by identifying patterns and correlations within the data, such as biomarkers linked to therapeutic responses. For example, molecular data retrieved from the knowledge graph may be used to simulate toxicity profiles for new drug candidates. The results of such simulations may be fed back into the knowledge graph.

In some embodiments, the analytics engine 250 facilitates the generation of visual analytics, including interactive charts, heatmaps, and trend analyses. For instance, a query about drug efficacy trends across clinical trial phases may result in a bar chart or scatter plot illustrating response rates for each drug. The analytics engine 250 may also create comparative reports by juxtaposing metrics from different datasets, such as public and proprietary data. The analytics engine 250 supports user-defined configurations tailor analyses to users' specific needs. For example, researchers studying cardiovascular diseases might configure the analytics engine 250 to prioritize data related to heart disease biomarkers, therapies, and patient demographics. Additionally, the analytics engine 250 supports multi-modal analysis, combining text, numerical data, and visual inputs for a comprehensive view.

In some embodiments, the analytics engine 250 incorporates domain-specific models and ontologies to enhance its analytical capabilities. For instance, in life sciences, the analytics engine 250 may include models trained to identify molecular pathways associated with drug toxicity or efficacy. Similarly, in finance, the analytics engine 250 may analyze market trends to identify correlations between economic indicators and asset performance.

The front-end interface 255 may be a software application interface that is provided and operated by the knowledge management system 110. For example, the knowledge management system 110 may provide a SaaS platform or a mobile application for users to manage data. The front-end interface 255 may display a centralized platform in managing research, knowledge, articles and research data. The front-end interface 255 creates a knowledge management platform that facilitates the organization, retrieval, and analysis of data, enabling users to efficiently access and interact with the knowledge graph, perform queries, generate visualizations, and manage permissions for collaborative research activities.

The front-end interface 255 may take different forms. In one embodiment, the front-end interface 255 may control or be in communication with an application that is installed in a client device 130. For example, the application may be a cloud-based SaaS or a software application that can be downloaded in an application store (e.g., APPLE APP STORE, ANDROID STORE). The front-end interface 255 may be a front-end software application that can be installed, run, and/or displayed on a client device 130. The front-end interface 255 also may take the form of a webpage interface of the knowledge management system 110 to allow clients to access data and results through web browsers. In some embodiments, the front-end interface 255 may not include graphical elements but may provide other ways to communicate, such as through APIs.

In some embodiments, various engines in the knowledge management system 110 support integration with external tools and platforms. For example, researchers might export the results of an analysis to external software for further exploration or integration into larger workflows. These capabilities enable the knowledge management system 110 to serve as a central hub for generating, visualizing, and disseminating data-driven insights.

In some embodiments, one or more machine learning models 260 can enhance the analytical capabilities of the knowledge management system 110 by identifying patterns, predicting outcomes, and generating insights from complex and diverse datasets. A machine learning model 260 may be used to identify entities, fuse entities, analyze relationships within the knowledge graph, detect trends in clinical trial data, or classify entities based on entities' features. A model can perform tasks such as clustering similar data points, identifying anomalies, or generating simulations based on input parameters.

In some embodiments, different machine learning models 260 may take various forms, such as supervised learning models for tasks like classification and regression, unsupervised learning models for clustering and dimensionality reduction, or reinforcement learning models for optimizing decision-making processes. Transformer-based architectures may also be employed, including encoder-only models, such as BERT, encoder-decoder models, for tasks like entity extraction and semantic analysis; decoder-only models, such as GPT, for generating textual responses or summaries; and encoder-decoder models, for complex tasks requiring both contextual understanding and generative capabilities, such as machine translation or summarization. Domain-specific variations of transformers, such as BioBERT for biomedical text, SciBERT for scientific literature, and AlphaFold for protein structure prediction, may also be integrated. AlphaFold, for example, uses transformer-based mechanisms to predict three-dimensional protein folding from amino acid sequences, providing valuable insights in the life sciences domain.

Knowledge Graph Generation

Figure 3:
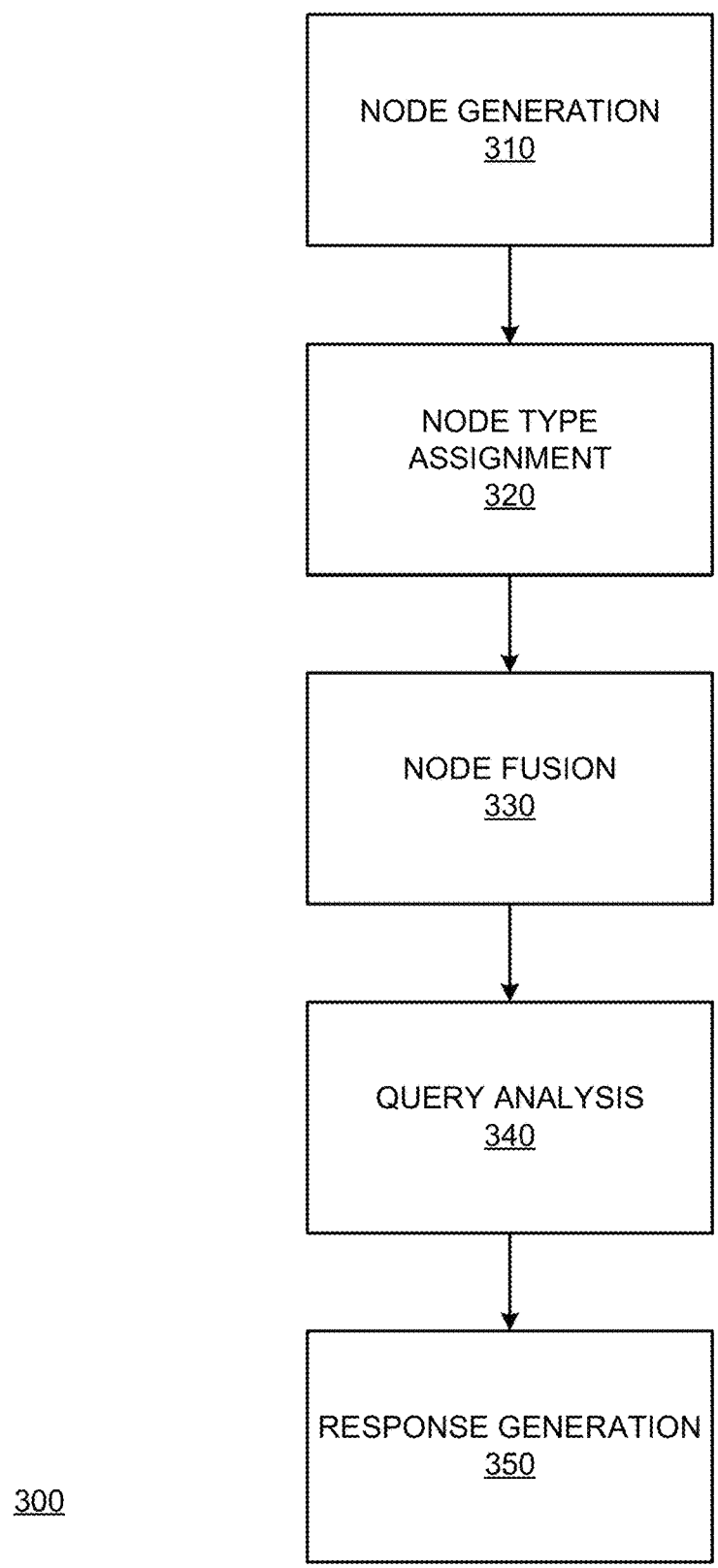
FIG. 3 is a flowchart illustrating a process for generating a knowledge graph and responding to a query based on the knowledge graph, in accordance with some embodiments.

FIG. 3 is a flowchart illustrating a process 300 for generating a knowledge graph and responding to a query based on the knowledge graph, in accordance with some embodiments. The process 300 may include node generation 310, node type assignment 320, node fusion 330, query analysis 340, and response generation 350. In various embodiments, the process 300 may include additional, fewer, or different steps. The details in the steps may also be distributed in a different manner described in FIG. 3.

In some embodiments, at node generation stage 310, the knowledge management system 110 processes unstructured text to generate nodes in a knowledge graph. The knowledge management system 110 may convert the input text into embeddings, such as using the techniques discussed in the vectorization engine 220. For example, the vectorization engine 220 may employ various embedding techniques, including encoder-only transformers, to analyze and represent textual data in a latent high-dimensional space.

In response to embeddings being created, the knowledge management system 110 determines whether each embedding corresponds to an entity. The knowledge management system 110 may apply classification methods, such as multi-target binary classification. Further detail and examples of techniques used in entity classification are discussed in FIG. 2 in association with the entity identifier 225. The knowledge management system 110 may evaluate a set of embeddings to identify multiple entities within a single dataset simultaneously. For instance, when analyzing a research article, the knowledge management system 110 may detect entities like diseases, drugs, or clinical outcomes, assigning a binary classification for each target category. This classification can be enhanced with domain-specific models or ontologies to refine the identification process further.

In some embodiments, at node assignment stage 320, the knowledge management system 110 performs node type assignment to categorize an identified node into one or more predefined types. The knowledge management system 110 may analyze the embedding representations of nodes generated during the previous stage. The embeddings, which encode semantic and contextual information, are processed using a classification algorithm to assign a specific label to each node. The classification algorithm may be a multi-class or hierarchical classifier, depending on the granularity of the node types required.

The knowledge management system 110 employs context-aware models to understand the relationships and attributes of nodes. For example, if the nodes represent terms extracted from a dataset, the system evaluates their co-occurrence with known keywords, their syntactic structure, and their semantic similarities to existing labeled examples. This evaluation assigns nodes such as "diabetes" as diseases, while "insulin" is categorized as a drug.

In some embodiments, the knowledge management system 110 supports multi-target classification. For instance, a term like "angiogenesis" may be classified as both a molecular pathway and a therapeutic target, depending on its context in the data. The knowledge management system 110 may resolve such ambiguities by analyzing broader relationships, such as the presence of related entities or corroborative textual evidence within the dataset.

In some embodiments, the node assignment process incorporates domain-specific ontologies, which provide hierarchical definitions and relationships for entities. For instance, in the context of life sciences, the system may refer to ontologies that delineate diseases, treatments, and biomarkers. Additionally, the knowledge management system 110 employs probabilistic scoring to handle uncertain classifications. Nodes may be assigned a confidence score based on the strength of their alignment with predefined types. If a node does not meet the confidence threshold, the knowledge management system 110 may flag the node for further review.

In some embodiments, at node fusion stage 330, the knowledge management system 110 performs node fusion to consolidate nodes representing identical or closely related entities across the dataset. This process eliminates redundancy and improves the knowledge graph by maintaining a consistent structure with minimal duplication. The knowledge management system 110 evaluates textual, contextual, and embedding-based similarities to determine whether nodes should be merged.

In the node fusion process, the knowledge management system 110 employs a variety of techniques to consolidate nodes that represent the same or similar entities. The knowledge management system 110 may identify candidate nodes for fusion. Text matching is one example approach, focusing on direct comparisons of textual representations to identify equivalence or near equivalence. Text matching includes perfect matching strategies such as identifying exact matches, stripping symbols to detect equivalence (e.g., "a-b" and "a b"), and matching text in a case-insensitive manner (e.g., "a b" and "A B"). Nodes with identical or nearly identical text representations are flagged as potential duplicates. For example, if one node is labeled as "Multiple Sclerosis" and another as "MS," the knowledge management system 110 detects a potential match based on direct equivalence or domain-specific normalization rules, such as removing case sensitivity or abbreviations.

In addition to or in alternative to simple text matching, the knowledge management system 110 employs embedding-based comparisons to evaluate semantic similarity. Each node is represented as an embedding in a high-dimensional space. The knowledge management system 110 may calculate proximity between the embeddings using measures such as cosine similarity. For example, embeddings for terms like "MS," and "Multiple Sclerosis," may cluster closely, indicating semantic equivalence.

In some embodiments, the knowledge management system 110 may also apply contextual analysis to further refine the node fusion stage 330. The knowledge management system 110 examines the relationships of candidate nodes within the knowledge graph, including the nodes edges and connected entities. Nodes sharing identical or highly similar connections are likely to represent the same entity. For example, if two nodes, "Transient Ischemic Attack" and "TIA," are both linked to the same clinical trials and treatments, the knowledge management system 110 may merge the two entities based on relational equivalence. The knowledge management system 110 leverages question-and-answer techniques using language models. The language models may interpret queries and provide contextual validation for potential node mergers. For instance, a query such as "Is ozanimod the same as Zeposia?" allows the knowledge management system 110 to evaluate the equivalence of nodes based on nuanced context and additional data.

Further examples of how nodes may be fused are discussed in FIG. 2 in association with the knowledge graph constructor 235.

The output of node fusion stage 330 may take the form of a largely de-duplicated and unified set of nodes arranged as the knowledge graph. The knowledge graph may define the data structure for the unstructured text in the corpus. Each fused node represents a consolidated entity that integrates all relevant information from its original components.

Referring back to FIG. 3, in some embodiments, at query analysis stage 340, the knowledge management system 110 performs query analysis to interpret and transform user-provided inputs or system-generated requests into a format that aligns with the structure of the knowledge graph. The knowledge management system 110 may receive a query, which may take various forms, such as natural language questions, keyword-based searches, or analytical prompts. The query may be processed by vectorization engine 220 to generate one or more embeddings that capture the meaning and context of the input. For instance, a user query such as "What treatments are available for multiple sclerosis?" can be converted into multiple embeddings. The knowledge management system 110 may use various natural language processing (NLP) techniques to decompose the query into the constituent components, such as entities, relationships, and desired outcomes. The knowledge management system 110 may perform entity recognition to identify the entities in the query and decompose the query into entities, context, and relationships. The decomposition may involve syntactic parsing to identify the query's grammatical structure, semantic analysis to determine the meaning of its components, and entity recognition to extract relevant terms. For example, the term "multiple sclerosis" might be mapped to a disease node in the knowledge graph, while "treatments" may correlate with drug or therapy nodes.

In some embodiments, the knowledge management system 110 may also perform intent analysis to determine the purpose of the query. Intent analysis identifies whether the user seeks statistical data, relational insights, or specific entities. For example, the knowledge management system 110 might infer that a query about "clinical trial outcomes for drug X" is requesting a structured dataset rather than a textual summary.

The system further translates the query into a structured format compatible with graph traversal algorithms. This format includes specific instructions for searching nodes, edges, and attributes within the knowledge graph. For example, a query asking for "phase 2 clinical trials for drug Y" is converted into a set of instructions to locate nodes labeled "drug Y," traverse edges connected to "clinical trials," and filter results based on attributes indicating "phase 2." The query may be converted into one or more structural queries such as SQL queries that retrieve relevant data to provide answers to the query.

In some embodiments, the query analysis may also integrate contextual understanding, domain specific knowledge, historical interactions with a particular user, and/or user preferences stored in the knowledge management system 110. For example, if a user frequently queries biomarkers related to oncology, the knowledge management system 110 may prioritize oncology-related nodes and relationships when interpreting subsequent queries.

In some embodiments, the query analysis may also be question based. In some embodiments, the knowledge management system 110 pre-identifies a list of questions that are relevant to each document in the corpus and stores the list of questions in the knowledge graph. The lists of questions may also be converted into embeddings. In response to receiving a query, the knowledge management system 110 may convert the query into one or more embeddings and identify which question embeddings in the large knowledge graph are relevant or most relevant to the query embedding. In turn, the knowledge management system 110 uses the identified question embeddings to identify entities that should be included in the response of the query.

In some embodiments, based on the various query analyses 340, the knowledge management system 110 may produce one or more refined, structured query representations that can executed in searching the knowledge graph and/or other data structures.

In some embodiments, at response generation stage 350, the knowledge management system 110 generates a response to an analyzed query to synthesize and deliver information that directly addresses the query interpreted in the query analysis stage 340. The response generation may include retrieving relevant data from various sources, such as the knowledge graph, data stores that include various data, and the documents in the corpus. In turn, the knowledge management system 110 may format the retrieved data appropriately and synthesize the data into a cohesive output for the user.

In some embodiments, the knowledge management system 110 may traverse a knowledge graph to locate nodes, edges, and associated attributes that match the query's parameters. For example, a query for "approved treatments for multiple sclerosis" prompts the system to identify nodes categorized as drugs and filter the nodes based on relationships or attributes indicating regulatory approval for treating "multiple sclerosis." The knowledge management system 110 may also determine the optimal format for presenting the results. This determination depends on the query's context and the type of information requested. For instance, if the query asks for numerical data, such as "response rates in phase 2 trials for drug X," the knowledge management system 110 may organize the data into a structured table. If the query seeks relational insights, such as "connections between biomarkers and drug efficacy," the knowledge management system 110 may invoke a generative AI tool (e.g., a generative model provided by the model serving system 145) to generate a visual graph highlighting the relationships between the relevant nodes.

In some embodiments, in generating responses, the knowledge management system 110 may apply text summarization techniques when appropriate. For example, if a query requests a summary of clinical trials for a specific drug, the knowledge management system 110 may condense information from the associated nodes and edges into a concise, natural language paragraph. The knowledge management system 110 may also integrate contextual enhancements to improve the user experience. For example, if the knowledge management system 110 identifies gaps or ambiguities in the query, the knowledge management system 110 may invoke a generative model to supplement the information or follow-up suggestions. For a query about "biomarkers for cancer treatments," the response might list the biomarkers and propose related queries, such as "What clinical trials involve these biomarkers?" Where the response requires visualizations, such as charts or graphs, the knowledge management system 110 may employ the analytics engine 250 to create interactive representations. For instance, a bar chart comparing the efficacy of multiple drugs in treating a condition might be generated, with each bar representing a drug and its associated response rate.

In response to receiving a query, the knowledge management system 110 delivers a response to the user, tailored to the query's intent and enriched with contextual or supplementary insights as needed. The generated response facilitates user decision-making and further exploration by presenting precise, actionable information derived from the knowledge graph.

Compression-Based Embedding Search

Figure 4A:
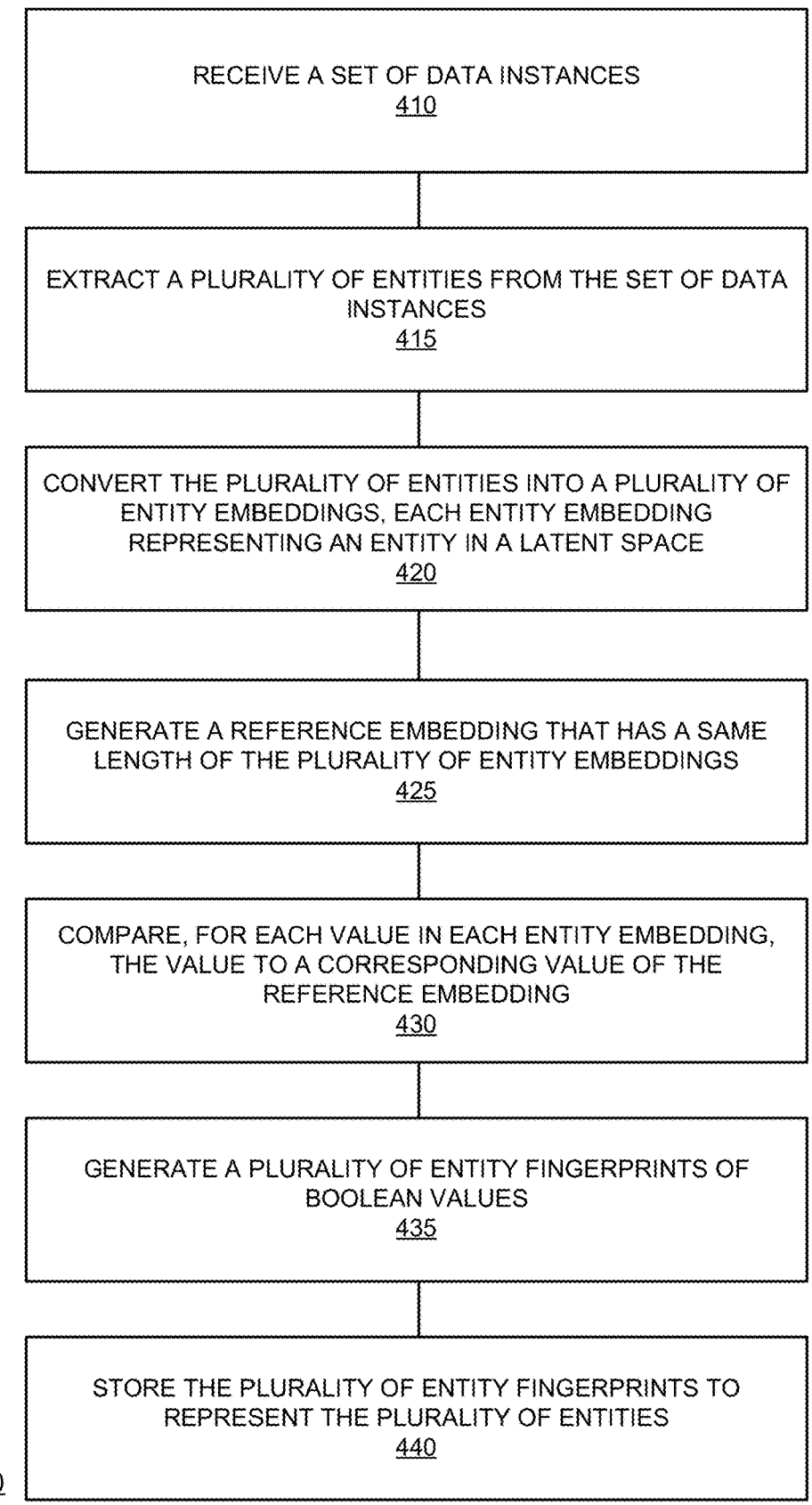
FIG. 4A is a flowchart depicting an example process for performing compression-based embedding search, in accordance with some embodiments.

FIG. 4A is a flowchart depicting an example process 400 for performing compression-based embedding search, in accordance with some embodiments. While process 400 is primarily described as being performed by the knowledge management system 110, in various embodiments the process 400 may also be performed by any suitable computing devices. In some embodiments, one or more steps in the process 400 may be added, deleted, or modified. In some embodiments, the steps in the process 400 may be carried out in a different order that is illustrated in FIG. 4A.

In some embodiments, the knowledge management system 110 may receive 410 a set of data instances. The set of data instances may include a corpus of documents. A data instance may represent a research article, a clinical trial document, a technical specification, or any examples of documents as discussed in FIG. 1. In some embodiments, the data instances may be multi-modal. For example, the set of data instances may include various documents in different formats such as unstructured text, images, and audio files. The knowledge management system 110 can ingest various data formats from multiple data sources, including public repositories, private databases, and proprietary datasets provided by client organizations.

To process the incoming data instances, the knowledge management system 110 may employ a data integrator 210, which supports multiple data modalities and formats such as plain text, JSON, XML, PDFs for textual data, and JPEG or PNG for image data. Metadata associated with the data instances, such as publication dates or source details, may also be extracted and standardized during ingestion to ensure uniformity. For example, unstructured text might include sentences such as, "Patients with chronic obstructive pulmonary disease (COPD) treated with Salbutamol showed improvement," which may be parsed into manageable components for downstream processing.

Further details on receiving data instances and managing various data types are described in the detailed system overview and associated diagrams, including FIG. 1 and FIG. 2.

In some embodiments, the knowledge management system 110 may extract 415 a plurality of entities from the set of data instances. In some embodiments, an entire article can be viewed as an entity. In some embodiments, paragraphs and sentences in the article can be viewed as entities. Entities may also be various data elements such as any relevant objects of attention in the context of a specific domain. In the domain of life science research, entities may be names of diseases, drugs, molecular pathways, etc. Additional examples of entities are discussed in FIG. 1 and FIG. 2. The entity extraction process may be performed by the entity identifier 225, which uses embeddings generated by the vectorization engine 220 to identify and classify entities. Additional details of entity extraction are further discussed in the node generation stage 310 in FIG. 3.

By way of example, to extract the plurality of entities, the knowledge management system 110 may, for example, divide a data instance into smaller segments, such as sentences or paragraphs. Entities within these segments may then be identified using one or more machine learning models, such as transformer-based language models or binary classification systems. For example, a sentence like, "The study showed that Ibuprofen reduces inflammation in patients with rheumatoid arthritis," may yield entities such as "Ibuprofen," "inflammation," and "rheumatoid arthritis."

In some embodiments, to extract entities, the knowledge management system 110 may employ multi-target binary classification techniques. This allows the simultaneous identification of multiple entity types, such as diseases, drugs, or biomarkers. Each entity candidate may be evaluated based on its embedding representation and the contextual relationships within the segment. The entity extraction process may also involve the fusion of duplicate or related entities, such as consolidating "MS" and "multiple sclerosis" into a unified node.

In some embodiments, the knowledge management system 110 may convert 420 the plurality of entities into a plurality of entity embeddings. Each embedding represents an entity in a latent, high-dimensional space. For example, each embedding may take the form of FP32 vector of 64 values in length, meaning each embedding has 64 dimensions. Other numbers of dimensions may also be used, such as 16, 32, 64, 128, 256, 512, 1024 or other numbers that are not in the power of 2. Similarly, the precision of each value can be FP4, FP8, FP16, FP32, FP64 or other forms of precision such as integers. This conversion process, managed by the vectorization engine 220, transforms entities into embeddings that encode semantic, syntactic, and contextual features. In some embodiments, the set of data instances (e.g., a corpus of documents) may generate N embeddings, with each embedding being 64 values in length, and each value being FP32. These sets of numerical values will be used as the example for the rest of disclosure, but in various embodiments other vector length and precision may also be used.

In various embodiments, a variety of methods for generating embeddings may be used, depending on the type of data—text, images, or audio. For example, for text-based entities, the knowledge management system 110 may employ techniques such as transformer-based models like BERT or another encoder model. The embeddings may capture subtle semantic nuances, such as associating "myocardial infarction" closely with "heart attack" in a latent space. Other methods such as Word2Vec generating embeddings by mapping words based on words' co-occurrence in large corpora, Latent Semantic Analysis (LSA) identifying latent themes in text to produce thematic representations, etc., may also be used. Other methods may include autoencoders that compress text into embeddings by encoding and decoding the input data into a latent space.

For image-based entities, the knowledge management system 110 may employ convolutional neural networks (CNNs) to identify visual features such as edges, textures, or structural patterns, converting the visual features into embeddings. For example, annotated molecular diagrams or histopathological patterns may be encoded based on their visual attributes. Object detection models focusing on identifying and vectorizing specific regions within images may also be used. Graph-based models extract structural connectivity from annotated scientific diagrams, encoding relationships into embeddings.

For audio data, embeddings may be generated by first transcribing spoken terms or numerical values into text using speech-to-text models. The resulting text is then vectorized using text embedding methods. In some embodiments, audio signals may also be directly processed into embeddings by extracting features in the audio files to capture phonetic and acoustic characteristics.

In some embodiments, the knowledge management system 110 may integrate embeddings from different modalities to create unified, multi-modal representations. For instance, joint text-image embedding models may cross-reference between textual descriptions and visual data. Transformer-based multi-modal models may also align embeddings across text and images using cross-attention mechanisms.

One or more embedding methods may allow the vectorization engine 220 to process and represent entities across various data formats. Further details on embedding processes are discussed in association with the vectorization engine 220 in FIG. 2.

In some embodiments, the knowledge management system 110 may generate 425 a reference embedding that has the same length as the plurality of entity embeddings. The reference embedding serves as a representative vector that facilitates comparison with individual entity embeddings, reducing computational complexity while retaining the meaningful structure of the data. For example, if each of the entity embeddings is a vector of 64 values in length, the reference embedding is also a vector of 64 values in length.

To generate the reference embedding, the knowledge management system 110 may aggregate the values of the plurality of entity embeddings using statistical methods. For instance, the knowledge management system 110 may calculate the mean, median, or mode of the values across the embeddings, or apply a weighted combination to emphasize certain embeddings based on their importance or relevance. In some embodiments, the reference embedding may also be based on the Fourier transform of entity embeddings. In some embodiments, the reference embedding is an average of the N entity embeddings extracted. For example, for each dimension in the 64 dimensions, the knowledge management system 110 determines the mean value of the dimension among N entity embeddings. This aggregation process may allow the reference embedding to capture the commonalities of the entity embeddings while maintaining a fixed dimensional structure.

In some embodiments, the knowledge management system 110 may employ techniques that adapt the aggregation method to the characteristics of the dataset. For datasets with high variability among embeddings, a weighted aggregation approach may prioritize embeddings that represent high-confidence entities. Alternatively, or additionally, for datasets with outliers, median-based aggregation provides robustness by mitigating the influence of extreme values.

FIG. 5A is a conceptual diagram illustrating the generation 425 of a reference embedding, in accordance with some embodiments. The knowledge management system 110 may process N entity embeddings 502. Each entity embedding is a vector of length W. Each dimension in length W has a value at a precision that occupies a certain number of bits (e.g., FP32). Hence, the number of bits used by each entity embedding 502 is the length W multiplied by the number of bits at the precision. Note that the number of squares in FIG. 5A is for illustration only and does not correspond to the actual length or the precision. In aggregating N entity embeddings 502, a reference embedding 506 is generated with the length W and having values that are at the same precision as the entity embeddings 502.

Referring back to FIG. 4A, in some embodiments, the knowledge management system 110 may compare 430, for each value in each entity embedding, the value to a corresponding value in a reference embedding. This comparison is performed elementwise across the dimensions of the embeddings and serves as an operation to transform high-dimensional vectors into compressed representations for efficient storage and retrieval.

To execute the comparison, the knowledge management system 110 may process each entity embedding, which represents an entity in a latent high-dimensional space, individually to compare each entity embedding to the reference embedding. Each dimension of the reference embedding represents a central value, serving as a benchmark for comparisons. The knowledge management system 110 may compare whether each dimensional value in the entity embedding is larger or smaller than the reference embedding.

For example, the system evaluates each dimension of an entity embedding against the corresponding dimension of the reference embedding. If the value in the entity embedding exceeds the value in the corresponding dimension of the reference embedding, the system may assign a Boolean value of "1." Conversely, if the value is lower, the system may assign a Boolean value of "0." To speed up the process, an entity embedding may be minus from the reference embedding and the sign of each dimension is determined.

The comparison process may be represented by the pseudocode below, where X represents an entity embedding and Mean represents the reference embedding:

```
For X − Mean in each X:
    for element[1, 64] in (X − Mean):
        element[1..64] < 0 => false
        else => true
    Y = 0
    Y << false / true
```

Y is an entity fingerprint that is a Boolean vector of 64 Boolean values in length. Each entity fingerprint Y corresponds to an entity embedding X. Each entity fingerprint Y is 32 times smaller than entity fingerprint Y because Y has 64 dimensions of binary values while X has 64 dimensions of FP32 values. Y can take the form of a Boolean value or can be converted into an integer of 64 bits Y1. As such, each entity embedding may be converted into an integer of 64 bits. Either Boolean value Y or 64-bit integer Y1 may be referred to as an entity fingerprint. While Y being having a string of Boolean values is used as an example of entity fingerprint, in various embodiments, the fingerprints may also be in other format, such as in decimal space, octal format, hexadecimal, etc.

Figure 5B:
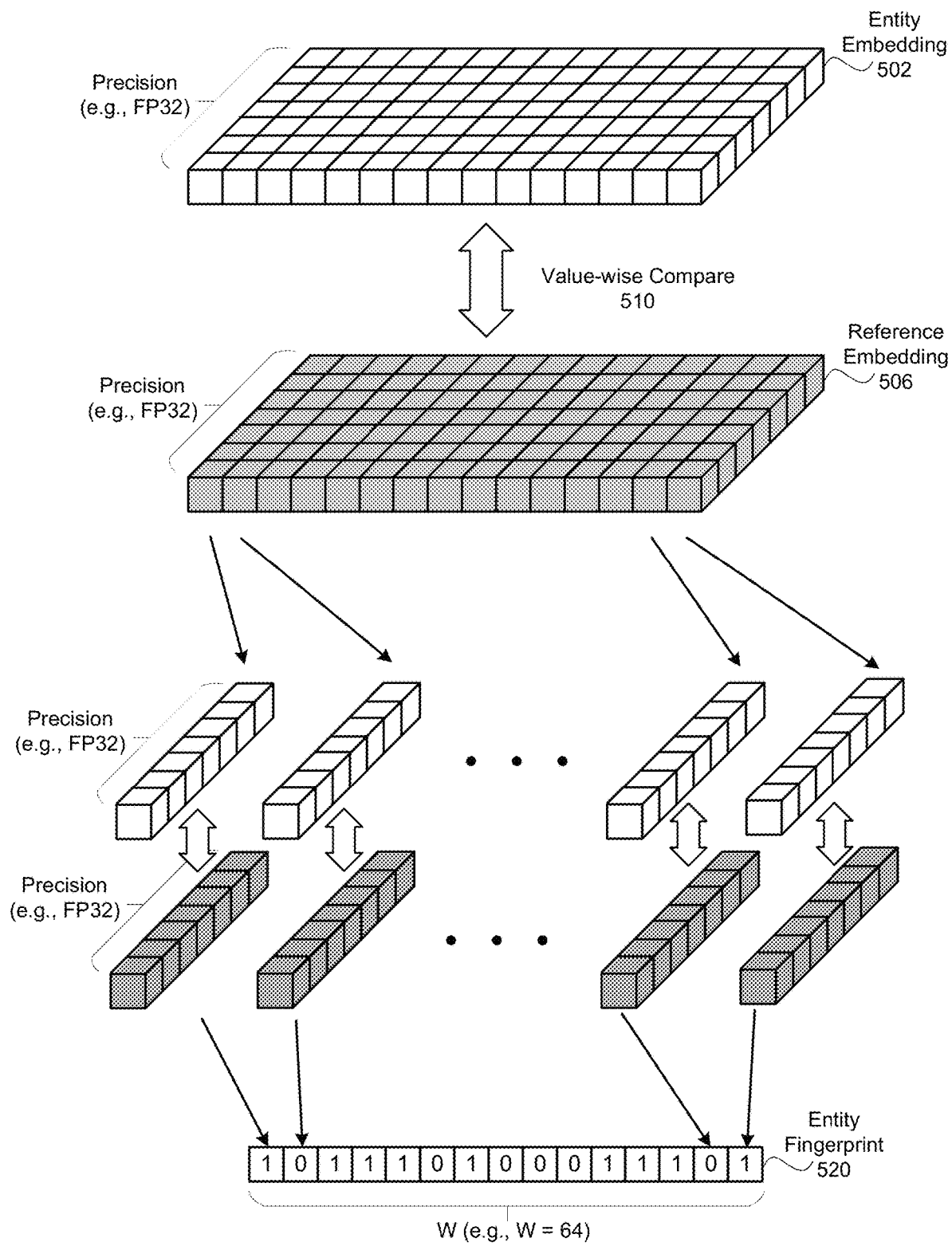
FIG. 5B is a conceptual diagram illustrating the comparison process between a single entity embedding and the reference embedding, in accordance with some embodiments.

FIG. 5B is a conceptual diagram illustrating the comparison process between a single entity embedding 502 and the reference embedding 506, in accordance with some embodiments. The comparison is a value-wise comparison 510 and each value has a precision of FP32. For each comparison result, a single binary bit is generated. In total, for W dimensions, W binary bits are generated as the entity fingerprint 520.

This binary logic operation transforms the high-dimensional floating-point data into a compact Boolean representation, significantly reducing memory and computational requirements while preserving essential relationships. This value-wise comparison ensures that the knowledge management system 110 captures relative differences in embeddings while reducing embedding size. The compression allows for applications such as fast query response, efficient knowledge retrieval, and scalable storage. The compressed representation not only minimizes redundancy but also enhances the computational efficiency of operations performed on the knowledge graph or other data structures.

Referring back to FIG. 4A, in some embodiments, the knowledge management system 110 may generate 435 a plurality of entity fingerprints. Each entity fingerprint corresponds to an entity embedding and provides a compressed, efficient representation of the entity. The fingerprints can take the form of integers or vectors comprising Boolean values. To create the fingerprints, the knowledge management system 110 utilizes the results from the value-wise comparison performed in Step 430. Specifically, the system constructs each fingerprint by mapping the Boolean outputs from the comparison into a structured representation. For example, the system assigns a "1" or "0" to each position in a Boolean vector based on whether the corresponding dimension of an entity embedding exceeds the value of the reference embedding at that position.

In some embodiments, the Boolean vector can be further converted into an integer format, where each position in the vector corresponds to a bit in the integer. These integers can be of various lengths, such as 32-bit, 64-bit, 128-bit, or 256-bit. For example, a 64-bit integer provides $2^{64}$ unique fingerprints, which can represent up to $2^{64}$ distinct types of concepts or entities. $2^{64}$ is roughly larger than $10^{19}$, which provides often more sufficient variations to store the world's various concepts in compressed 64-bit integer format. This number of variations allows the knowledge management system 110 to accommodate the vast diversity of entities encountered across various datasets and domains. The higher the bit length of the integer, the more concepts can be uniquely represented, making the compression algorithm scalable for applications that require handling massive datasets or highly nuanced entities.

The fingerprints are designed to facilitate rapid similarity searches and comparisons, such as those based on Hamming distance, which measures the difference between two binary representations. The knowledge management system 110 may quickly identify entities with similar characteristics or relationships and allows the knowledge management system 110 to traverse a knowledge graph traversal quickly to perform query matching and data retrieval.

In some embodiments, the knowledge management system 110 may store 440 the plurality of entity fingerprints to represent the plurality of entities. The fingerprints, generated in step 435, serve as compact and efficient data representations of entities in a knowledge graph to allow for rapid processing, retrieval, and analysis within the knowledge management system 110. The storage of fingerprints is optimized to support high-performance querying and scalability for extensive datasets.

The entity fingerprints, which is only N-bit integer each (e.g., N=64), can be stored in a variety of ways, including random-access memory (RAM) for rapid access during real-time computations or in persistent storage such as hard drives or cloud-based data stores for long-term use. For applications requiring immediate response times, fingerprints may be stored in RAM, leveraging the high-speed computation of similarity searches, Hamming distance calculations, or other computational tasks. The underlying data instances may be stored in a typical non-volatile data store, such as a hard drive. As such, the retrieval and identification of relevant entities can be done using data in RAM and be performed in an accelerated process. After the entities are identified, corresponding relevant data instances, such as the documents, can be retrieved from the data store.

In some embodiments, the knowledge management system 110 structures the entity fingerprints in a way that allows efficient indexing and retrieval. With 64-bit integers allowing $2^{64}$ unique fingerprints, the system can store and distinguish $2^{64}$ different entities or concepts, which covers an extraordinary range of possible real-world and abstract entities. Higher bit-length fingerprints, such as 128-bit or 256-bit integers, further expand this capacity, supporting a nearly infinite variety of nuanced distinctions.

Storing fingerprints in this manner enables the system knowledge management system 110 to integrate seamlessly with knowledge graphs or other structured representations of knowledge. The fingerprints can act as unique identifiers for nodes in a knowledge graph, allowing for efficient traversal and analysis of entity relationships. Moreover, the compressed nature of the fingerprints reduces the overall data size, minimizing storage costs and enabling the handling of large-scale datasets in memory-constrained environments.

The storage framework also supports dynamic updates, enabling the knowledge management system 110 to add, modify, or delete fingerprints as new entities are discovered or existing entities are updated. This flexibility ensures that the knowledge management system 110 remains adaptable and relevant across evolving datasets and use cases. By efficiently storing the plurality of entity fingerprints, the knowledge management system 110 can achieve a balance between scalability, computational performance, and storage efficiency.

Query Search

Figure 4B:
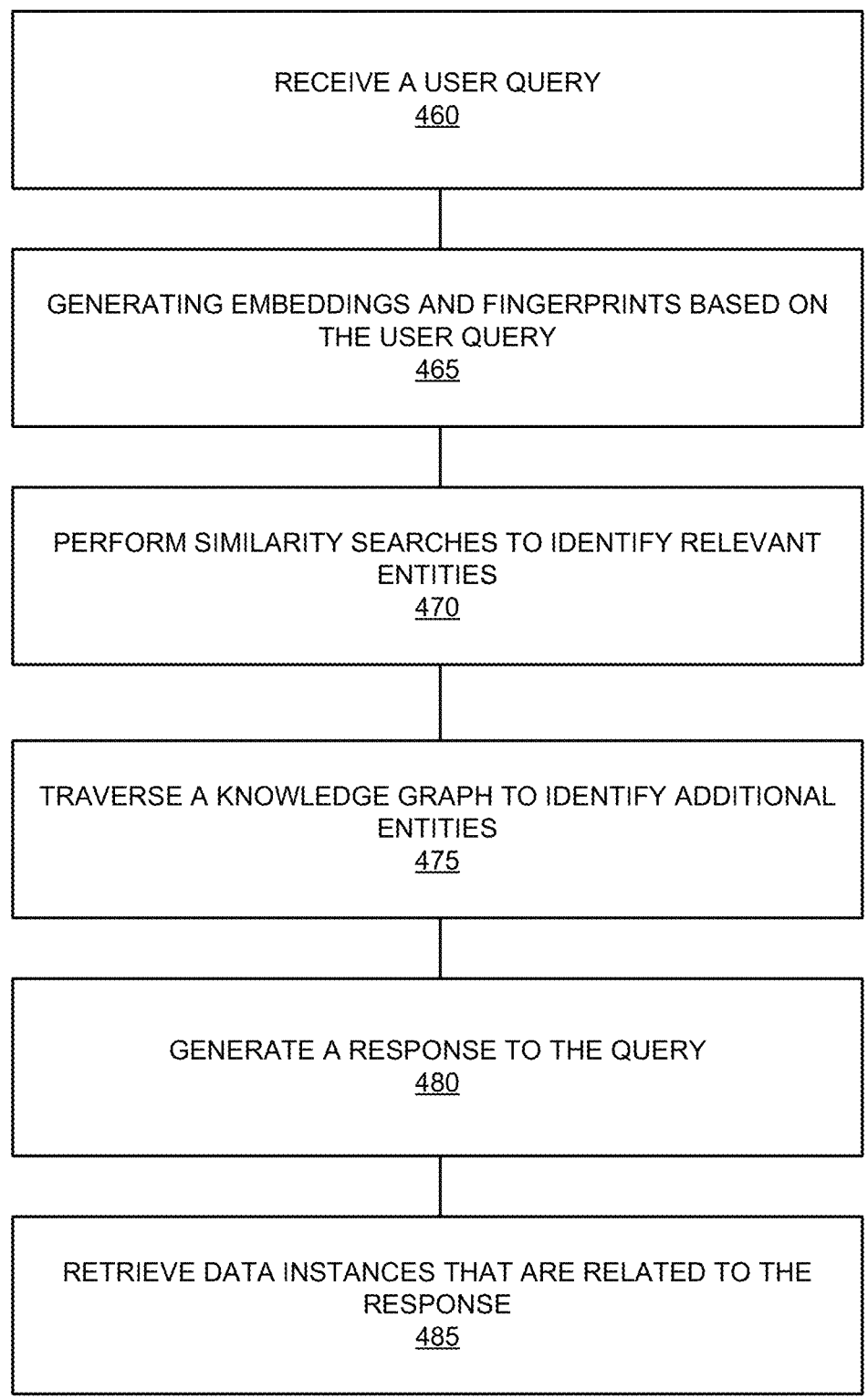
FIG. 4B is a flowchart depicting an example process for performing a compression-based query search, in accordance with some embodiments.

FIG. 4B is a flowchart depicting an example process 450 for performing a compression-based query search, in accordance with some embodiments. While the process 450 is primarily described as being performed by the knowledge management system 110, in various embodiments the process 450 may also be performed by any suitable computing devices. In some embodiments, one or more steps in the process 450 may be added, deleted, or modified. In some embodiments, the steps in the process 450 may be carried out in a different order that is illustrated in FIG. 4A.

In some embodiments, the knowledge management system 110 may leverage compressed entity fingerprints generated in process 400 discussed in FIG. 4A for efficient and accurate information retrieval to implement a compression-based query search. The process 450 may include receiving 460 a user query, generating 465 embeddings and fingerprints based on the user query, performing 470 rapid similarity searches to identify relevant entities, traversing 475 a knowledge graph to identify additional entities, generating 480 a response to the query, and retrieving 485 data instances that are related to the response.

In some embodiments, the knowledge management system 110 may receive 460 a user query. A user query may include natural language inputs such as "What drugs are associated with hypertension?" or more complex analytical prompts like "Compare efficacy rates of treatments for hypertension across clinical trials." User queries can be manually generated by users through an interactive user interface, where the users input specific prompts or questions tailored to the users' information needs. Alternatively, or additionally, user queries may be automatically generated by the knowledge management system 110, such as through a question extraction process. For example, the knowledge management system 110 may parse unstructured text, including research articles or clinical trial data, to identify and extract potential questions. This extraction process involves analyzing the content of the text using natural language processing (NLP) models, such as transformer-based models, to identify logical segments that can be reformulated as structured questions. For instance, a passage discussing the efficacy of a drug might yield questions like, "What is the efficacy rate of [drug] for treating [condition]?" These automatically generated queries can be stored as nodes in a knowledge graph and linked to relevant entities. The knowledge management system 110 may quickly retrieve pre-generated questions based on a project of a user and allow the user to refine the pre-generated questions further to suit the users' research objectives.

In some embodiments, the knowledge management system 110 may generate 465 embeddings and fingerprints based on the user query. The identification of entities in the user query and generating embeddings and query fingerprints are largely the same as step 415 through step 435 discussed in FIG. 4A and can be performed by vectorization engine 220, entity identifier 225, and data compressor 230 of the knowledge management system 110. The detail of the generation of query fingerprints is not repeated here.

In some embodiments, the knowledge management system 110 may perform 470 similarity searches to identify entities that are relevant to the user query. The similarity searches may be performed based on comparing the query fingerprints generated in step 465 and the entity fingerprints stored in step 440 in the process 400.

By way of example, to identify relevant entities, the knowledge management system 110 compares the query fingerprint with the plurality of entity fingerprints stored in memory. The knowledge management system 110 may calculate similarity metrics to determine matches. Similarity metrics may take various forms, such as Hamming distance, cosine similarity, Euclidean distance, Jaccard similarity, or Manhattan distance, depending on the nature of the fingerprints and the requirements of embodiments. Various metrics may provide different ways to quantify the similarity or dissimilarity between fingerprints.

In some embodiments, the knowledge management system 110 uses Hamming distance to define similarity. In some embodiments, the system knowledge management system 110 may pass the query fingerprint and each entity fingerprint through bitwise operations such as logical operations and sum the outputs to measure the similarity between the query fingerprint and an entity fingerprint. The logical operations may be exclusive-or (XOR), NOT, OR, AND, other suitable binary operations, or a combination of those operations. An entity fingerprint with a small Hamming distance (e.g., smaller number of bit flips) to the query fingerprint is more similar and may be prioritized in the search results.

The compressed vector search may be used to scan through a very large number of entity fingerprints to identify relevant ones. For example, the knowledge management system 110 may generate a query fingerprint Q, which comprises Boolean values of a defined length W. Q represents the fingerprint of a user query. The knowledge management system 110 compares Q against a corpus of target entity fingerprints Y, where each Y contains Boolean values and also has the length W. The search involves computing the Hamming distance between Q and each fingerprint Y in the corpus using a Boolean XOR operation, followed by summation of the resulting Boolean values. The knowledge management system 110 determines the closest match by identifying the fingerprint(s) with the minimum Hamming distance(s). In some cases, the system may retrieve the closest k matches to accommodate broader queries.

Figure 5C:
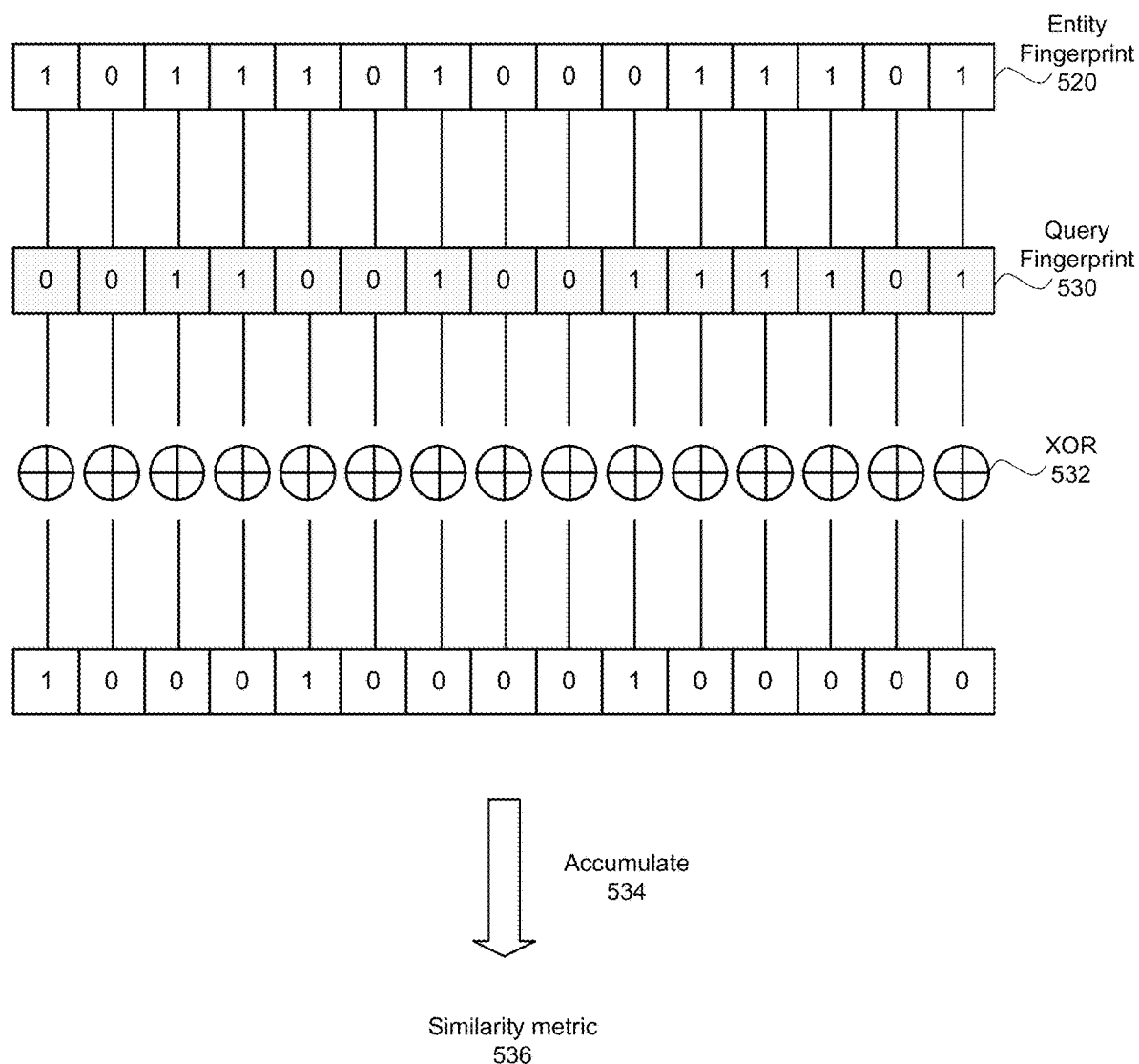
FIG. 5C is a conceptual diagram illustrating the comparison between an entity fingerprint and a query fingerprint using a series of XOR circuits, in accordance with some embodiments.

FIG. 5C is a conceptual diagram illustrating the comparison between an entity fingerprint 520 and a query fingerprint 530 using a series of XOR circuits 532. While XOR circuits 532 are used as the examples, other logical circuits such as AND, OR, NOT, or any combination of logical circuits may also be used. The bitwise XOR operations may be a series of binary values that can be accumulated 534 using an accumulation circuit. The accumulation result is a value of a similarity metric 536. In this case, the similarity metric 536 is the Hamming distance between the entity fingerprint 520 and the query fingerprint 530.

The use of XOR operators may allow the knowledge management system 110 to rapidly process and identify relevant entities, even from vast datasets containing billions of entity fingerprints. For example, the operation may be accelerated in hardware. Between a query fingerprint and an entity fingerprint, a series of XOR circuits may be used to determine the bit flip at each position between the corresponding values in two fingerprints. In turn, the outputs of the XOR circuits can be accumulated by an accumulator circuit. This operation may be performed extremely efficiently in hardware.

To optimize performance, the knowledge management system 110 may use high-performance computing architectures, such as GPUs, SIMD, or ASICs. The hardware architecture significantly accelerates the calculations, enabling the processing of large datasets. Compression-based vector search also allows end-user processors to perform search of entities extremely efficiently so that edging computing can be performed efficiently. For example, on a MAC M1 processor, based on using 64-bit entity fingerprints, the knowledge management system 110 can process 400 million vectors in approximately 500 milliseconds. Processing speed is further enhanced when the fingerprint length W is a power of two, aligning with the word size of the processor, such as 16-bit, 32-bit, 64-bit, 128-bit, or 256-bit. The use of compression-based vector search supports scalable and efficient knowledge articulation, enabling applications such as large-scale knowledge graph management and acceleration of large language models.

In response to identifying relevant entity fingerprints, the knowledge management system 110 may map the identified entity fingerprints to their corresponding entities, such as drugs, diseases, biomarkers, or other concepts stored in the knowledge graph. In some embodiments, the knowledge management system 110 may additionally traverse 475 a knowledge graph to identify additional entities. The traversal process involves navigating the nodes and edges of the knowledge graph to identify relationships between the identified entities and other connected entities.

For example, if a query relates to a specific drug, the knowledge management system 110 may traverse the graph to identify diseases treated by the drug, molecular pathways influenced by the drug, or clinical trials in which the drug has been evaluated. Each node in the knowledge graph represents an entity, and edges represent the relationships between entities, such as "treats," "is associated with," or "participates in." Traversing the connections allows the knowledge management system 110 to identify indirect relationships or contextually relevant entities that may not be immediately apparent from the original query.

The traversal may be guided by specific criteria, such as the type of relationships to follow (e.g., therapeutic or causal), the depth of traversal (e.g., first-order or multi-hop connections), or the relevance scores associated with nodes and edges. In some embodiments, the traversal process is augmented by machine learning algorithms that prioritize high-relevance paths based on historical query patterns or domain-specific knowledge. For instance, the knowledge management system 110 might prioritize traversing edges associated with high-confidence relationships or nodes with strong metadata signals, such as frequently cited research or recently updated clinical data.

In cases where the graph includes weighted edges, the knowledge management system 110 can consider the strength of relationships in traversing certain paths. For example, a stronger edge weight may indicate a higher degree of confidence or frequency of co-occurrence, directing the knowledge management system 110 toward more reliable connections. Additionally, the knowledge management system 110 may use graph algorithms, such as breadth-first or depth-first search, to systematically explore the graph while ensuring efficiency and relevance.

After traversing the graph and identifying additional entities, the system may further refine the results by applying filtering criteria, clustering related entities, or ranking the results based on relevance to the query. The identified set of entities, along with the contextual relationships, can then be returned to the user or used in downstream processes, such as generating summaries, visualizations, or recommendations.

Referring back to FIG. 4B, in some embodiments, the knowledge management system 110 may generate 480 a response to the user query. For example, identified entities may be returned to the user as part of the query response. Responses may be presented in various formats, including natural language explanations, visualized knowledge graphs, or structured datasets. By way of example, natural language explanations may provide detailed descriptions of the identified entities and their relationships, formatted in a way that mimics human-written text. For instance, if the query is "What drugs are associated with hypertension?" the knowledge management system 110 may respond with: "The following drugs are commonly associated with the treatment of hypertension: Lisinopril, Metoprolol, and Amlodipine. These drugs act by lowering blood pressure through mechanisms such as vasodilation or beta-adrenergic blockade." The response may also include contextual insights, such as recent research findings or approval statuses, to enrich the user's understanding.

Structured datasets may present the response in tabular or other suitable formats, providing an organized view of the retrieved entities and their attributes. For example, a query like "List clinical trials for diabetes treatments" may return a table with columns such as "Trial Name," "Drug Evaluated," "Phase," "Number of Participants," and "Outcome." Users can export these datasets for further analysis or integrate them into their workflows. Structured data may also include ranked lists based on relevance or confidence scores, enabling users to prioritize their focus. In some embodiments, the response may include visualizations, such as charts or graphs. The knowledge management system 110 may employ the analytics engine 250 to create interactive representations. For instance, a bar chart comparing the efficacy of multiple drugs in treating a condition might be generated, with each bar representing a drug and its associated response rate.

In some embodiments, responses may also include multimedia elements. For example, if the query involves visual data, such as histopathological patterns or annotated graphs, the knowledge management system 110 may incorporate images, charts, or annotated diagrams alongside textual explanations. Similarly, audio summaries could be generated for accessibility or to cater to user preferences in specific contexts, such as mobile usage.

Continuing to refer to FIG. 4B, in some embodiments, the knowledge management system 110 may retrieve 485 data instances that are related to response. For example, the data instances may include documents, articles, clinical trial records, research papers, or other relevant sources of information. The data instances provide the underlying context or detailed content associated with the entities or results identified during the query processing. In some embodiments, the steps 460 through step 480 may be performed using fast memory such as RAM. For example, the entity fingerprints may be stored in RAM and the comparison between a query fingerprint and entity fingerprints may be performed by saving values using RAM or cache in processors. In some embodiments, the data instances may be stored in data store. After the fast compression-based vector search is performed, the knowledge management system 110 may retrieve the identified data instances from data store.

Figure 5D:
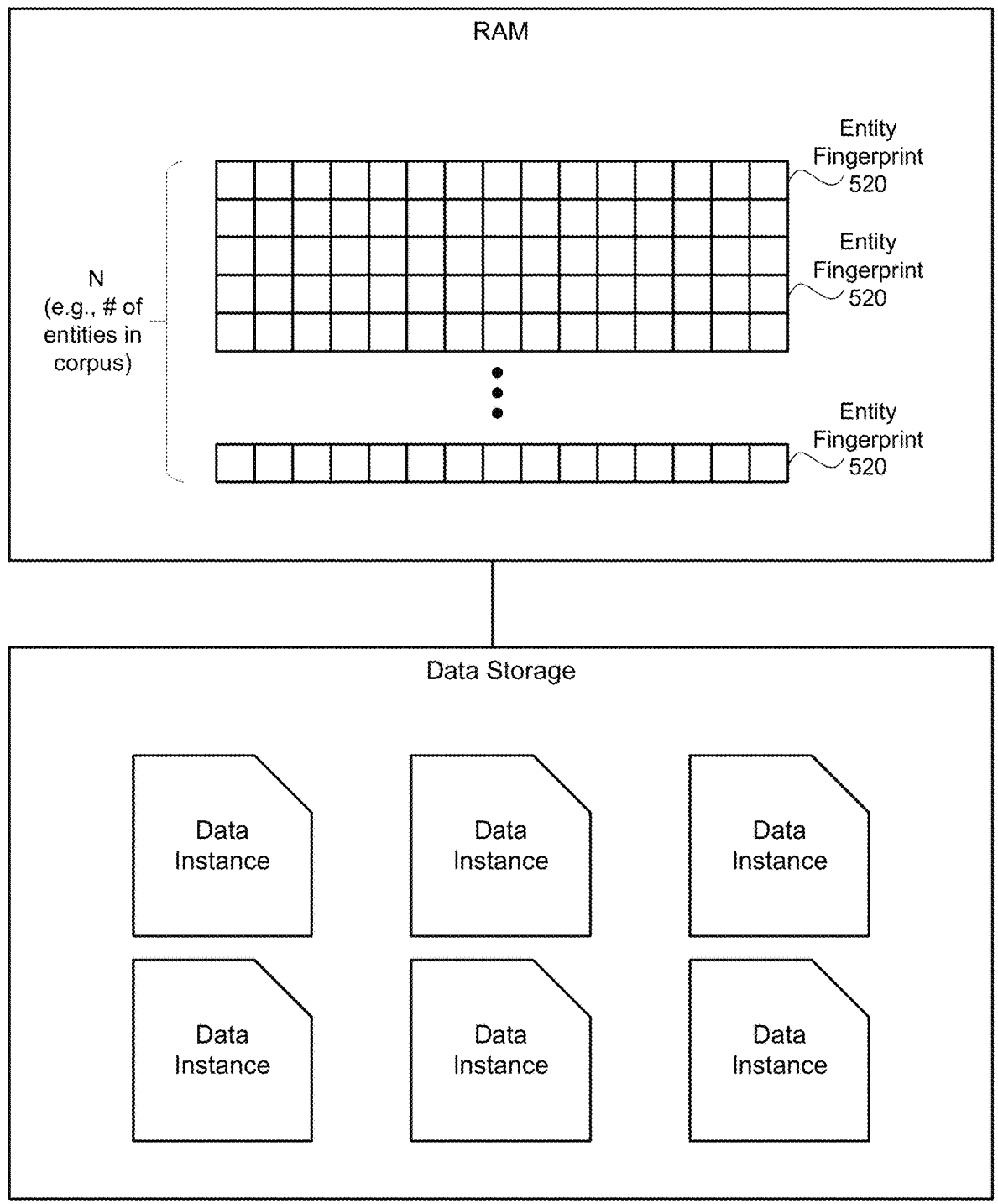
FIG. 5D illustrates an architecture of rapid entity fingerprint comparison and analysis, in accordance with some embodiments.

FIG. 5D illustrates an architecture of rapid entity fingerprint comparison and analysis, in accordance with some embodiments. Since each entity fingerprint 520 is only an N-bit integer, the entity fingerprints 520 that correspond to a vast number of entities may be stored in RAM. The underlying data instances, such as the documents and files, may be stored in a data storage.

The compressed nature of entity fingerprints allows the system to store and process large-scale data efficiently. For example, fingerprints represented as 64-bit integers can encode $2^{64}$ unique entities, enabling precise searches across an immense knowledge base. The structure significantly reduces computational overhead while maintaining high retrieval accuracy, making it scalable for extensive datasets. For example, the compression-based vector search approach enhances the speed, scalability, and flexibility of querying large knowledge corpora. By using entity fingerprints and query fingerprints, the knowledge management system 110 supports diverse use cases such as identifying drugs related to specific conditions, searching for clinical trial data relevant to a query, or navigating knowledge graphs for detailed entity relationships. The combination of compression techniques, similarity search, and advanced query refinement allows the knowledge management system 110 to deliver accurate and contextually relevant results, supporting applications in various domains beyond life science, such as in financial analytics, engineering, or Internet search. For example, the components of the knowledge management system 110 and various processes described in this disclosure can be used to construct an Internet search engine.

Information Density

In some embodiments, the knowledge management system 110 optimizes information density by leveraging the compression techniques discussed in FIGS. 4A and 4B to transform complex, high-dimensional data into compact binary integer fingerprints. In some embodiments, the knowledge management system 110 may employ encoder models to capture the semantic essence of unstructured text or other data modalities. The knowledge management system 110 uses the compression process so that more information can be encapsulated within smaller vector representations. This process allows the system to manage information more efficiently, enabling tasks like retrieval, clustering, and knowledge articulation with unprecedented accuracy and scalability.

The system achieves a significant improvement in information density through vector size reduction. For example, unstructured text data—ranging from tokens and words to full articles—can be compressed into compact representations, such as Boolean or integer vectors, using techniques discussed in process 400 and process 450. Each binary vector represents a fingerprint of the original entity, with 64-bit integers capable of storing up to 2^64 unique combinations. This level of granularity is sufficient to uniquely represent virtually every article, image, or concept within a large corpus.

The high information density not only facilitates accurate information retrieval across diverse data types but also enables hybrid storage architectures. For instance, fingerprints can be loaded into high-speed RAM for rapid searches, while associated detailed information resides in slower storage mediums like solid-state drives or databases. Once a query identifies the relevant fingerprint, the knowledge management system 110 can quickly retrieve the corresponding data from persistent storage. The approach balances speed and scalability, ensuring efficient operation even with large datasets.

Moreover, the resultant compressed vectors are versatile and can be leveraged for tasks such as clustering or supervised and unsupervised learning. The compact representations enable the knowledge management system 110 to organize underlying documents into meaningful structures, derive insights, and even serve as input for next-generation neural networks. For example, Y vectors derived through Boolean transformations can be clustered rapidly to group related concepts or entities, enhancing the system's analytical capabilities.

The approach of the knowledge management system 110 to information density also facilitates knowledge articulation and the implementation of large language models, potentially reducing reliance on GPU-intensive operations. By maintaining a compact yet information-rich representation of knowledge, the knowledge management system 110 supports scalable, efficient, and precise management of vast and complex datasets.

Attention Mechanism

In some embodiments, the knowledge management system 110 employs attention mechanism and related techniques to enhance the precision of answer searches, particularly in response to queries involving complex or nuanced data relationships. The attention mechanism may be multi-head attention in a transformer model. The attention mechanism may be used in step 470 of process 450 in identifying the most relevant entities.

In some embodiments, the knowledge management system 110 may first identify the closest K candidate entity fingerprints from a set of entity fingerprints Y that are most similar to the query fingerprint Q. For example, the candidate entity fingerprints can be identified based on distance metrics such as Hamming distance, which evaluates the bitwise similarity between the query and entity fingerprints.

In response to the closest K candidate entity fingerprints are identified, the knowledge management system 110 clusters the candidate entity fingerprints into groups using Boolean distance calculation and/or similar operations. The knowledge management system 110 may use any suitable clustering techniques to generate the clusters, such as K-means clustering, k-Medoids, hierarchical clustering and other suitable clustering techniques. For binary vectors, clustering techniques such as Hamming distance-based K-means or median-cut clustering may be used. Additionally, or alternatively, techniques such as partitioning around medoids (PAM) or Bisecting K-means may also be used. The clustering techniques may group high-dimensional binary data by using Boolean distance metrics like Hamming distance to measure similarity between vectors. By way of example, for each cluster, the knowledge management system 110 may evaluate a function that maximizes the function's value as the distance between the query fingerprint Q and any individual vector C within the cluster reduces. For example, a representative function could be EXP(AND(Q, C)), where the output emphasizes areas of high similarity between Q and C. By summing the outputs of this function across clusters, the knowledge management system 110 identifies one or more clusters that are closest to the query.

The knowledge management system 110 may conduct a selection of a cluster to yield the most general and accurate answer for the query. A summation function prioritizes the closest cluster based on aggregated similarity. To further refine the process, the knowledge management system 110 may integrate learnable parameters into the attention mechanism. EXP (AND (Q, C)) is a representation of attention function when Q & C are one dimensional vectors. In some embodiments, the function EXP(AND(Q, C)) can be expanded with learnable parameters that adapt based on training data or domain-specific requirements. This flexibility enhances the capability of the knowledge management system 110 to generate accurate and contextually relevant answers.

By using clustering, distance-based operations, and advanced attention mechanisms, the knowledge management system 110 can deliver precise, actionable answers tailored to user queries. These techniques not only optimize the accuracy of search results but also enable scalable and efficient handling of vast knowledge corpora.

In some embodiments, the knowledge management system 110 may also uses keyword fingerprints for identifying one or more entity fingerprints. Certain entities may be clustered together in a knowledge graph and one or more keywords may be assigned to the cluster. The keywords may be extracted from a section of a document in which one or more entities belong to the cluster are extracted. The knowledge management system 110 may also use a language model to generate one or more keywords that can represent the cluster. In some embodiments, the knowledge management system 110, in analyzing a section of a document, may also generate one or more questions (prompts) that are relevant to the document. Keywords may be extracted from those questions. The keywords may be converted to embeddings and fingerprints using the process 400. In some embodiments, entities that are similar to the query may be identified by identifying the relevant keyword entities to the query and computing the overlapping space that falls within a defined distance of the keyword entity. The entities that fall within the space provides a narrower set of space to detect the highest matching entities for use for the response. The keyword based approach may be used as a direct matching process to identify relevant entities or may be used as a filtering criterion before process 450 or step 470 is performed.

Knowledge Graph Implementation

In some embodiments, the knowledge management system 110 may use a knowledge graph to identify structured relationships among entities and embeddings. The use of knowledge graph may be part of the step 475 of process 450.

In some embodiments, the knowledge graph utilizes a query vector Q with dimensions [1, W], a set of target vectors Y that can be combined as a matrix with dimensions [N, W], and a new series of vectors G1, G2, G3, ..., Gn with arbitrary dimensions. The G vectors represent master lists for specific types of entities, including but not limited to diseases, drug names, companies, mechanisms of action, biomarkers, data ownership, sources, user information, security keys, article names, and database entries. For example, each G corresponds to a master list of a type of entities. The master lists are converted into Boolean vectors to provide compressed representations of the associated entity types.

In a situation where the vectorization engine 220 and the entity identifier 225 generate an embedding for a particular entity, the embedding can have the highest correlation (or high correlation) with the paragraph or context in the document where the entity is mentioned. Through the attention mechanism discussed above, the knowledge management system 110 may create a direction relationship between the G series of vectors to target the Y vectors.

For every incoming query vector Q, the knowledge management system 110 selects specific G vectors based on relevance to the query vector Q, such as the query's context or intent. The knowledge management system 110 may conduct a similarity search between the query vector Q and the Y vectors to identify top candidate matches of Y vectors. These top candidates are further cross-verified against the selected G vectors to ensure precise alignment with the master lists and associated metadata. This dual-layer verification process enhances retrieval accuracy by combining semantic embedding similarity with categorical metadata validation.

The G vectors support traceability, authenticity, and lineage tracking. Each G vector may encode contextual metadata, such as the data source, ownership details, and security attributes. This encoding facilitates robust tracking of the information's origin and integrity, providing an additional layer of security.

In some embodiments, the knowledge management system 110 may use encoder-only architecture to generate the embeddings. The use of encoder-only transformer ensures that the knowledge graph is articulated without incorporating predictive next-token generation. This avoids hallucination, as the embeddings and relationships are strictly based on the existing tokens and their contexts. This design ensures high-fidelity knowledge articulation, making the knowledge management system 110 particularly suitable for applications requiring accurate and trustworthy information retrieval.

Meta Information Tagging

In some embodiments, the knowledge management system 110 enhances the representation of entities by assigning meta-information to entity fingerprints. The meta-information serves as supplementary data that captures additional characteristics or contextual details about each entity. In some embodiments, the meta-information may be appended to the entity fingerprints, extending the fingerprints' size to include the metadata, which allows for finer classification and differentiation of entities across various dimensions. In some embodiments, the appending of meta-information to the entity fingerprints may be part of the step 435 of the process 400. For example, an entity fingerprint appended with the meta-information is in 2N-bit long in which a first set of N bits correspond to the entity fingerprint and a second set of N bits correspond to the meta-information. Keeping the fingerprint in the length of exponent of 2 may speed up the entire computation process.

For instance, the knowledge management system 110 may extend the original fingerprint vector W to W+1 by appending a bit that encodes categorical information. If the additional bit is set to "1," the entity may belong to category A, and if set to "0," it belongs to category B. This approach can be scaled to include multiple bits for representing more complex metadata, such as data source provenance, domain type, data sources, ownerships of documents, ontological categories, user annotations, or lineage information. For example, in a knowledge graph where entities are categorized by the entities' sources, entities from scientific journals like Nature might be tagged with one set of bits, while entities from regulatory data like FDA filings could be tagged with another. Documents or entities belong to the same source or same owner may also be tagged as part of the meta-information. This differentiation aids in improving search precision and result filtering when dealing with multi-source datasets.

Tagging of meta-information also enhances the accuracy of information retrieval and processing tasks. When entities are tagged with meta-information, the knowledge management system 110 can prioritize or filter results based on criteria defined in the query. For example, a query seeking biomarkers associated with cancer can retrieve entities explicitly tagged with the "biomarker" category, bypassing unrelated entities.

Meta-information tagging also contributes to broader functionalities of the knowledge management system 110, such as maintaining traceability, ensuring authenticity, and tracking lineage. The ability to associate entities with entities' source data or user annotations allows the knowledge management system 110 to validate the origins of information and resolve ambiguities when integrating or cross-referencing datasets. Additionally, the appended metadata may facilitate security applications, where certain tags might represent access control levels or confidentiality classifications.

In some embodiments, the knowledge management system 110 may include the meta-information in a master list in knowledge graph implementation as part of the meta-information extension to extend the dimensionality of target vectors y1[1, W], y2[1, W], y3[1, W]. For example, if the possible tags derived from a G vector (such as G1) categorize the relationships of y1 through y4, and it is determined that y1 and y3 belong to category A while y2 and y4 belong to category B, a single bit can be added to the size of each vector. The extended vector dimensions would then be [1, W+1]. The value of the last bit can be used to indicate category membership: if the last bit is true, the vector belongs to category A; if false, it belongs to category B. This mechanism can be generalized further by increasing the size of the vector to store more complex metadata or identification attributes.

By incorporating these additional bits, the knowledge management system 110 improves accuracy when handling entities from multiple sources or differentiating the entities. The extended metadata enables more precise classification and retrieval by embedding source-specific or category-specific information directly within the vector representation. This enhanced tagging mechanism is particularly useful for applications that require clear differentiation of entities based on source, ownership, or contextual relevance.

Self-Learning Capabilities

In some embodiments, the knowledge management system 110 incorporates self-learning capabilities to enhance the functionality over time by automating task execution and reusability. By dividing information at a semantic level, the knowledge management system 110 can generate, test, execute, and save code for various tasks. These tasks can then be reused or adapted for subsequent operations, enabling efficient and iterative learning processes. For example, after completing meta information tagging, the final tagged texts can be used as inputs for a task such as "Categorize." Using large language models (LLMs), the knowledge management system 110 generates code to perform the task, tests the validity, and executes the task. This code operates on a component level to produce actionable outputs. The knowledge management system 110 saves the code and the explanation in an integer format, referred to as a task integer. The knowledge management system 110 may convert a set of tasks (e.g., actions) into task integers. The task integers may take the form task fingerprints or task metadata tags that can be appended to the entity fingerprints. For example, for a given entity's entity fingerprint, one or more task fingerprints may be associated with the entity fingerprint in a knowledge graph, or the entity fingerprint can be appended with one or more task metadata tags. This representation allows the knowledge management system 110 to recall and reuse pre-existing solutions for the entity in the future. For example, when a similar query is received, the knowledge management system 110 may identify similar entities. As such, the knowledge management system 110 may determine what similar tasks may be used for the query.

In some embodiments, the knowledge management system 110 may create a task integer table that includes a list of tasks (actions), task integers, and explanations. In some embodiments, the knowledge management system 110 may create a task integer table that includes a list of tasks (actions), task integers, and explanations. Each task integer serves as a compact numerical representation of a specific action or function that the system can perform. For instance, tasks such as "retrieve drug efficacy data," "compare biomarker relevance," or "generate a knowledge graph visualization" may each be assigned a unique integer identifier. The explanations associated with these integers provide detailed descriptions of the corresponding tasks, outlining their purpose, inputs, and expected outputs. This task integer table enables efficient indexing and retrieval of pre-defined actions, allowing the system to quickly match user queries or prompts with the appropriate tasks. Furthermore, the table may be dynamically updated to accommodate new tasks or refine existing entries, ensuring adaptability to evolving user needs and application contexts.

In some embodiments, the list of tasks in the task integer table may include, but is not limited to, actions such as analyzing, evaluating, assessing, critiquing, judging, rating, reviewing, examining, investigating, and interpreting. The list of tasks may also encompass organization and classification tasks such as categorizing, classifying, grouping, sorting, arranging, organizing, and ranking. Explanation tasks may include illustrating, demonstrating, showing, clarifying, elaborating, expressing, outlining, and summarizing. The table may further include relationship tasks such as connecting, contrasting, differentiating, distinguishing, linking, associating, matching, and relating. Action and process tasks may involve calculating, solving, determining, proving, applying, constructing, designing, and developing. Additionally, reasoning tasks may include justifying, arguing, debating, reasoning, supporting, validating, verifying, predicting, and inferring. These tasks represent a wide range of functions the system can perform, facilitating diverse applications and user interactions. Each of these task categories represents specific actions the knowledge management system 110 can autonomously perform, further enhancing the utility across various domains.

In some embodiments, in response to the knowledge management system 110 receiving a new query, the knowledge management system 110 searches the task integer table for potential matches. If a match exists, the corresponding pre-generated code is executed. If no match is found, the knowledge management system 110 generates new code, tests the task, and adds the task integer to the task integer table for future use. This self-learning approach reduces computational overhead by leveraging pre-computed solutions and continuously refining the capabilities of the knowledge management system 110. By learning from prior executions and refining its operations, the knowledge management system 110 achieves a dynamic and scalable framework for intelligent data processing and management.

Encrypted Data Search

Figure 6:
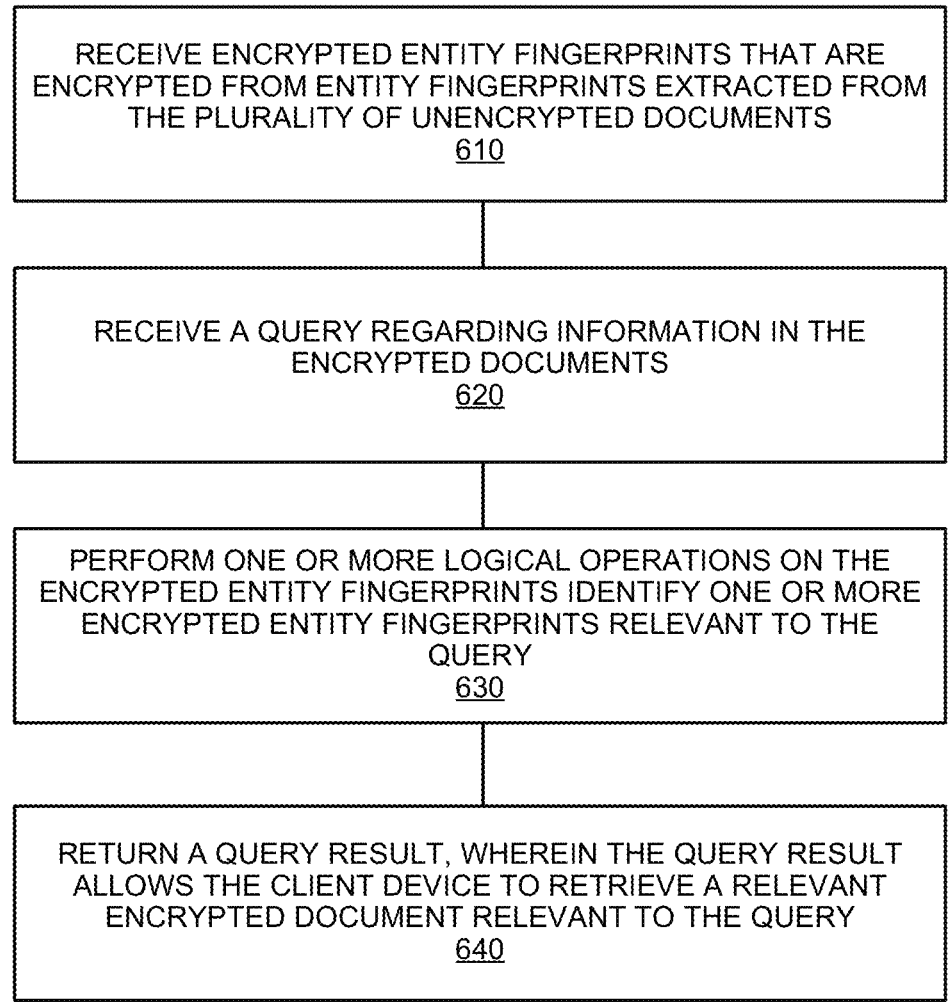
FIG. 6 is a flowchart depicting an example process for performing encrypted data search using homomorphic encryption, in accordance with some embodiments.

FIG. 6 is a flowchart depicting an example process 600 for performing an encrypted data search, in accordance with some embodiments. While process 600 is primarily described as being performed by the knowledge management system 110, in various embodiments the process 600 may also be performed by any suitable computing devices, such as a client-side software application. In some embodiments, one or more steps in the process 600 may be added, deleted, or modified. In some embodiments, the steps in the process 600 may be carried out in a different order that is illustrated in FIG. 6.

In some embodiments, process 600 allows the knowledge management system 110 to query the content of encrypted documents without possessing or accessing the unencrypted versions of the documents. The process 600 may use homomorphic encryption to allow secure operations on encrypted data. For example, a data store may be used to store encrypted documents that correspond to some documents in unencrypted forms. A client (e.g., a domain of an organization) may possess a homomorphic encryption private key 136 that is used to decrypt the documents. The knowledge management system 110 may publish a client-side software application 132. The client-side software application 132 may be used to extract entity embeddings and entities from the unencrypted documents in plaintext using techniques described in vectorization engine 220 and entity identifier 225 and generate entity fingerprints using the process 400 described in FIG. 4A. The entity extraction and fingerprint generation may be performed solely on the client side such as at a client device 130 so that the confidential information is not exposed, not even to the knowledge management system 110. The client-side software application 132 may uses a homomorphic encryption public key 112 (corresponding to homomorphic encryption private key 136) to encrypt the entity fingerprints and transmit the encrypted entity fingerprints to knowledge management system 110 for analysis under homomorphic encryption. As such, the knowledge management system 110 may perform search and query of the encrypted documents without gaining knowledge as to the confidential information in the encrypted documents.

The encryption mechanism ensures that sensitive data in the query remains secure throughout processing. For example, in some embodiments, the query and fingerprints may both be encrypted using a homomorphic encryption key, which enables the knowledge management system 110 to perform computations directly on the encrypted data. As such, the plaintext data is not exposed at any stage during query processing. On the client device 130, a corresponding homomorphic encryption private key may be used to decrypt results and retrieve relevant documents securely.

In some embodiments, the knowledge management system 110 may receive 610 encrypted entity fingerprints that are encrypted from entity fingerprints extracted from a plurality of unencrypted documents. Entity fingerprints provide compressed and secure representations of the content of unencrypted documents while preserving sufficient detail for analytical operations. In some embodiments, a plurality of encrypted documents is stored in a data store and corresponds to the plurality of unencrypted documents. The client device 130 has a homomorphic encryption private key 136 to decrypt the encrypted documents.

The generation of entity fingerprints in plaintext may begin with the ingestion of unstructured data from a wide range of sources, as described in FIG. 2 and FIG. 3. The sources may confidential and secret data that are possessed by a client. Natural language processing (NLP) models may be employed to extract entities, which represent discrete units of attention within the document, such as names, technical terms, or other domain-relevant concepts. Entities may be transformed into high-dimensional vector embeddings by the techniques described in vectorization engine 220, although in some embodiments the process may be performed by the client-side application 132 instead of the knowledge management system 110. The embeddings may capture the semantic and contextual relationships, representing the entities in a latent vector space.

The client-side application 132 may process the embeddings to generate entity fingerprints. Further detail related to the generation of entity fingerprints is described in process 400 in FIG. 4A, although in some embodiments the process may be performed by the client-side application 132 instead of the knowledge management system 110. A reference embedding is created by aggregating statistical measures (e.g., mean, median, or mode) across multiple entity embeddings. Each entity embedding is compared to the reference embedding on a value-by-value basis. If a particular value in the entity embedding exceeds the corresponding value in the reference embedding, a binary or other encoded value (e.g., Boolean, octal, or hexadecimal) is assigned to represent the relationship. This step produces a compact fingerprint that retains the essence of the entity's characteristics while significantly reducing the computational overhead required for storage and retrieval.

In turn, the entity fingerprints are encrypted using homomorphic encryption. In some embodiments, a homomorphic encryption key is utilized, enabling the resulting encrypted entity fingerprints to remain functional for computational purposes without necessitating decryption. Homomorphic encryption allows the system to perform logical operations directly on encrypted data, ensuring robust security while preserving computational capability. Depending on the type of homomorphic encryption scheme, the homomorphic encryption key used to encrypt the entity fingerprints can be a homomorphic encryption private key or a homomorphic encryption public key.

Various suitable homomorphic encryption schemes may be used in different embodiments. These may include fully homomorphic encryption (FHE), which allows arbitrary computations on encrypted data, ensuring maximum flexibility for complex operations while maintaining data confidentiality. For less computationally intensive applications, partially homomorphic encryption (PHE) schemes, such as RSA or ElGamal, can be utilized to support specific operations like addition or multiplication without needing full decryption. Some embodiments may also leverage leveled homomorphic encryption (LHE), which balances efficiency and functionality by supporting a predefined number of operations before requiring re-encryption. Additionally, variations like threshold homomorphic encryption enable distributed decryption among multiple parties, enhancing security in collaborative environments. The choice of homomorphic encryption scheme can be tailored to the computational requirements and security considerations of the knowledge management system 110.

In some embodiments, the knowledge management system 110 may receive 620 a query regarding information in the encrypted documents. The knowledge management system 110 processes the query to identify relevant matches within the encrypted documents stored in the data store. For instance, the query may be related to particular entities, such as diseases, drugs, or research findings that are stored in encrypted form to ensure data security and compliance. In some embodiments, the query may be converted into an embedding representation that encapsulates its semantic and contextual meaning. The embedding may be query fingerprints. The structured fingerprints are compared against stored encrypted fingerprints to determine matches, leveraging cryptographic techniques that preserve the security of all processed data The query received by knowledge management system 110 may be encrypted. For example, the query may be inputted by a user of an organization in plaintext and may be encrypted and converted into ciphertext. In some embodiments, the query received by knowledge management system 110 may include one or more encrypted query fingerprints. For example, a client-side client device 130 may extract entities and embeddings from the plaintext of the query. The client-side client device 130 in turn converts the entities and/or the query embeddings to query fingerprints and encrypt the query fingerprints. The encrypted query fingerprints are transmitted to the knowledge management system 110. The encrypted query fingerprints are structured representations of the query in the same format as the encrypted entity fingerprints stored in the knowledge management system 110. This alignment allows efficient and secure comparisons between the query and the stored data using advanced cryptographic techniques, including homomorphic encryption.

Alternatively, or additionally, the knowledge management system 110 may also receive the query in plaintext. The knowledge management system 110 may perform the encryption and generation of the encrypted query fingerprints on the side of the knowledge management system 110.

The knowledge management system 110 handles encrypted queries by enabling comparisons between encrypted fingerprints without requiring decryption. Specifically, the query fingerprints are formatted to match the encrypted entity fingerprints stored in the knowledge management system 110. By maintaining this consistent structure, the knowledge management system 110 enables rapid identification of matches using similarity metrics. To compute the similarity, the system processes bitwise values from the encrypted query fingerprints and the encrypted entity fingerprints using one or more logical circuits. These circuits execute operations to calculate a similarity metric, and their accumulated outputs determine the relevance of stored fingerprints to the received query.

Additionally, the query processing pipeline supports multi-step analysis to extract meaningful components and align the query with stored encrypted data. This includes decomposing the query into relevant structural elements, generating embeddings, and performing fingerprint-based comparisons. These steps allow the system to handle complex queries efficiently while maintaining robust encryption protocols.

In some embodiments, the knowledge management system 110 may perform 630 one or more logical operations on the encrypted entity fingerprints to identify one or more encrypted entity fingerprints relevant to the query. For example, the encrypted entity fingerprints may be compared with the query to identify the relevant encrypted entity fingerprints. For example, the query may be converted into one or more encrypted query fingerprints. Homomorphic encryption allows comparisons of encrypted fingerprints using certain operations, such as logical operations.

For example, in some embodiments, logical operations are executed on encrypted data using cryptographic techniques, such as homomorphic encryption, which allows computations to occur on encrypted data without requiring decryption. For example, encrypted entity fingerprints stored in the knowledge management system 110 are compared against the encrypted query fingerprints. The comparison involves calculating a similarity metric between the two sets of fingerprints to identify relevant matches. The comparison process is similar to the process 450 described in FIG. 4B, except the fingerprints are encrypted.

In some embodiments, the similarity metric computation is performed by passing bitwise values from the encrypted query fingerprints and the encrypted entity fingerprints into one or more logical circuits. These circuits perform operations, such as XOR or AND, to evaluate the alignment of bits between the two fingerprints. The comparison is further illustrated in FIG. 5C. The knowledge management system 110 accumulates the outputs of these operations to compute a relevance score. A higher score indicates a stronger match between the encrypted query and the encrypted entity fingerprints. In some embodiments using certain types of homomorphic encryption, the fingerprints can be directly compared. In some embodiments, using other types of homomorphic encryption, the fingerprints are first processed by a homomorphic encryption public key 112, then the fingerprints can be compared.

The generation and comparison of encrypted fingerprints are similar to various techniques and advantages discussed in FIG. 4A through FIG. 5D, except the fingerprints are compared in ciphertext in an encrypted space.

In some embodiments, the knowledge management system 110 may return 640 a query result. The query result allows a client device 130 to retrieve a relevant encrypted document associated with the query. As such, the results of the encrypted query processing are securely delivered to the client device 130 while maintaining data confidentiality and usability.

The query result typically includes one or more encrypted entity fingerprints that have been determined to be relevant to the query. These fingerprints act as secure identifiers or pointers to the encrypted documents stored in the data store that includes the encrypted documents. By providing the fingerprints rather than the actual documents, the knowledge management system 110 may minimize the exposure of sensitive data during transmission and maintains compliance with data protection standards.

On the client device 130, the encrypted fingerprints received in the query result can be used to retrieve the relevant encrypted documents from the data store that stores the encrypted documents. The retrieval process may involve the use of a homomorphic encryption private key stored on the client device 130. This homomorphic encryption private key may decrypt the encrypted entity fingerprints in the returned result or may decrypt the encrypted documents associated with the fingerprints, allowing the client device 130 to securely access the underlying unencrypted documents.

In some embodiments, the client device is configured with a client-side software application 132 that manages the generation of encrypted entity fingerprints, encryption of query, receipt of query result, and document retrieval and decryption process. The client-side software application 132 may handle some of the confidential data in plaintext, but does not transmit the plaintext outside of the organization or a secured domain. In some embodiments, the client-side software application may be in communication with the knowledge management system 110 and facilitate the secure handling of the private key to ensure that the decrypted documents remain protected on the client device 130 within an organization domain. Additionally, the application may support user-friendly features, such as displaying decrypted documents or providing tools for data analysis, making it easier for end-users to interact with the knowledge management system 110. For example, the interface feature described in FIG. 7A through FIG. 7D may be part of the feature of a client-side application 132.

For example, when a query result includes encrypted fingerprints relevant to a set of medical research articles, the client device 130 can decrypt the associated documents to extract detailed information about the studies. Similarly, in financial analytic s, the knowledge management system 110 can deliver encrypted fingerprints corresponding to encrypted datasets, which are then decrypted on the client device 130 to provide actionable insights.

In some embodiments, the knowledge management system 110 and a client-side application 132 may support a hybrid search that search through both encrypted documents and unencrypted documents. For example, a client may query the relevancy of confidential data in an encrypted space to public research articles in unencrypted space. This capability is particularly useful when combining proprietary or sensitive information with openly available datasets to derive insights without compromising the security of private data.

The hybrid search begins by encrypting the query for compatibility with the encrypted document space. The query may also be processed in plaintext for relevance matching in the unencrypted document space. Within the encrypted space, the knowledge management system 110 uses homomorphic encryption techniques to match encrypted query fingerprints against encrypted entity fingerprints securely. In the unencrypted space, information retrieval methods, such as the process 450 described in FIG. 4B, keyword searches and/or semantic similarity analysis, are employed to identify relevant public documents.

If the query spans multiple private datasets owned by different entities, the knowledge management system 110 ensures secure and permissioned access. The same encrypted query can be processed separately within each private library, enabling each entity to extract relevant information securely. This distributed processing model ensures that no sensitive data is shared or exposed between entities during the query execution. After the relevant encrypted and unencrypted data is identified, the results are aggregated.

The knowledge management system 110 may return a composite result based on metadata tags or permissions. For example, the same query can be encrypted separately into each entity library, extract the data and then decrypt the data within their library. Based on metatags or permissions, the extracted data can be combined within the private library of one entity to create a composite response. On the client-side application 132, the extracted information from the encrypted space may be decrypted within the private library of the querying entity. Metadata associated with the retrieved data, such as relevance scores or document identifiers, is used to align and integrate information from both encrypted and unencrypted spaces. This integration can occur entirely within the querying entity's secure environment, ensuring that sensitive data remains protected while enabling a composite response.

Alternatively, or additionally, the entities in the unencrypted space may be encrypted using the homomorphic encryption public key that is used to encrypt the entity fingerprints of the encrypted documents. As such, the entities from the unencrypted space and the entities form the encrypted space may be processed together to identify relevant entities to the query.

In some embodiments, the knowledge management system 110 may conduct query across multiple sets of encrypted documents. Each set of documents may be encrypted using different homomorphic encryption keys. In such embodiments, the knowledge management system 110 may repeat the process 600 to conduct homomorphic encryption comparisons to generate multiple query results. The query results may be combined based on metadata tags and permissions to generate a composite response. This technique can also be applied to a hybrid approach that includes different sets of encrypted documents and different sets of unencrypted documents.

Example Graphical User Interfaces

FIG. 7A is a conceptual diagram illustrating an example graphical user interface (GUI) 710 that is part of a platform provided by the knowledge management system 110, in accordance with some embodiments. In some embodiments, the platform may be a client-side application 132 that is locally resided in a client device 130 to maintain the confidentiality of data of an organization, as discussed in FIG. 6. In some embodiments, the platform may be a SaaS platform that is operated on the Cloud by the knowledge management system 110.

In some embodiments, the GUI 710 may include a prompt panel 712 located at the top of the interface, which allows users to input a prompt manually or utilize an automatically generated prompt based on project ideas, such as "small molecule therapies" This prompt panel 712 may include a text input field, an auto-suggestion dropdown menu, or clickable icons for generating prompts dynamically based on pre-defined contexts or project objectives. In some embodiments, the GUI 710 may also include a summary panel 714 prominently displaying results based on the inputted or generated prompt. The content in the summary panel 714 is a response to the prompt. The generation of the content may be carried out by the processes and components that are discussed previously in this disclosure in FIG. 2 through FIG. 5A. Although only text is displayed in the particular example shown in FIG. 7A, in various embodiments, the summary panel 714 may include visually distinct sections for organizing retrieved data, such as bulleted lists, numbered categories, or collapsible headings to enable quick navigation through results. The summary panel 714 may also include interactive features, such as checkboxes or sliders, allowing users to customize their query further. In some embodiments, the GUI 710 may include visualization to display structured data graphically, such as bar charts, tables, or node-link diagrams. The visualization may enhance comprehension by summarizing relationships, trends, or metrics identified in the retrieved information. Users can interact with this panel to explore details, such as clicking on chart elements to access more granular data.

FIG. 7B is a conceptual diagram illustrating an example graphical user interface (GUI) 730 that is part of a platform provided by the knowledge management system 110, in accordance with some embodiments. The platform currently shows a project view that includes a number of prompts located in different panels. In some embodiments, the GUI 730 may include a project dashboard displaying multiple panels, each corresponding to a distinct prompt. The panels may be organized into a grid layout, facilitating a clear and systematic view of the information retrieved or generated for the project. The prompts displayed in the panels can either be manually generated by a user or automatically generated by the knowledge management system based on the context of a project or predefined queries.

In some embodiments, in the GUI 730, each panel may include a title section that specifies the topic or focus of the prompt, providing a response to the prompt that is included in the panel. Similar to FIG. 7A, the generation of the content may be carried out by the processes and components that are discussed previously in this disclosure in FIG. 2 through FIG. 5A. The main body of the panel contains detailed text, such as summaries, analyses, or other content relevant to the prompt. The text area may feature scrolling capabilities to handle longer responses while maintaining the panel's compact size. In some embodiments, each panel may include actionable controls, such as icons for editing, deleting, or adding comments to the prompt or its associated data. Additionally, a "Source Links" section may be present at the bottom of each panel, enabling users to trace back to the original data or references for further verification or exploration. The identification of entities and sources may be carried out through traversing a knowledge graph, as discussed in FIG. 2 through FIG. 5A. In some embodiments, the GUI 730 may also include a navigation bar or menu at the top for project management tasks, such as creating new projects, switching between projects, or customizing the layout of the panels.

FIG. 7C is a conceptual diagram illustrating an example graphical user interface (GUI) 750 that is part of a platform provided by the knowledge management system 110, in accordance with some embodiments. The platform shows an analytics view that allows users to request the platform to generate in-depth analytics. In some embodiments, the GUI 750 may include an analytics dashboard designed to present in-depth insights in a visually intuitive and organized manner. The dashboard may include multiple panels, each focusing on a specific aspect of the analytics, such as summaries, statistical trends, associated factors, or predictive insights derived from the analytics engine 250. Additional examples of analytics are discussed in FIG. 2 in association with the analytics engine 250. These panels may be arranged in a grid or carousel layout. In some embodiments, each panel may feature a title bar that clearly labels the topic of the analytics, such as "Overview," "Prevalence," "Risk Factors," or "Symptoms." The topics may be automatically generated using the processes and components described in FIG. 2 through FIG. 5A and may be specifically tailored to the topic at the top of the panel. The main body of each panel may present information in different formats, including bulleted lists, graphs, charts, or textual summaries, depending on the type of analysis displayed.

In some embodiments, interactive features may be embedded in the panels, such as expandable sections, tooltips for detailed explanations, or clickable icons for further exploration. Users may also have the option to customize the layout or filter analytics based on specific parameters, such as timeframes, population groups, or research contexts. GUI 750 may also include a control panel or toolbar allowing users to request new analytics, export results, or modify the scope of the displayed data. Upon receiving a user selection of one of the analytics, the knowledge management system 110 may generate an in-depth report using the analytics engine 250.

FIG. 7D is a conceptual diagram illustrating an example graphical user interface (GUI) 770 that is part of a platform provided by the knowledge management system 110, in accordance with some embodiments. In some embodiments, the GUI 770 may include a question-answering panel designed to facilitate user interaction with prompts and generate structured responses. In some embodiments, the GUI 770 may include a prompt input section at the top of the panel. This section allows users to view, edit, or customize the prompt text. Prompts may be first automatically generated by the system, such as through process 500. Interactive features, such as an "Edit Prompt" button or inline editing options, enable users to refine the prompt text dynamically. Additionally, an optional "Generate Question" button may provide suggestions for alternative or improved prompts based on the system's analysis of the user's project or query context, such as using the process 500.

In some embodiments, the GUI 770 may include an answer input section beneath the prompt field. This section provides an open text area for the knowledge management system 110 to populate a response, such as using the processes and components discussed in FIG. 2 through FIG. 5A. The knowledge management system 110 may auto-fill this area with a response derived from its knowledge graph or underlying data sources. In some embodiments, the GUI 770 may also feature action buttons at the bottom of the panel. For example, a "Get Answer" button allows users to execute the query and retrieve data from the knowledge management system 110, while a "Submit" button enables the user to finalize and save the interaction to create a panel such us one of those shown in FIG. 7B.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN), long short-term memory networks (LSTM), transformers, and linear recurrent neural networks such as Mamba may also be used. For example, various embedding generation tasks performed by the vectorization engine 220, clustering tasks performed by the knowledge graph constructor 235, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to generate prompt embeddings, the training samples may be prompts generated from text segments, such as paragraphs or sentences. The labels for each training sample may be binary or multi-class. In training a machine learning model for prompt relevance identification, the training labels may include a positive label that indicates a prompt's high relevance to a query and a negative label that indicates a prompt's irrelevance. In some embodiments, the training labels may also be multi-class such as different levels of relevance or context specificity.

By way of example, the training set may include multiple past records of prompt-query matches with known outcomes. Each training sample in the training set may correspond to a prompt-query pair, and the corresponding relevance score or category may serve as the label for the sample. A training sample may be represented as a feature vector that includes multiple dimensions. Each dimension may include data of a feature, which may be a quantized value of an attribute that describes the past record. For example, in a machine learning model that is used to cluster similar prompts, the features in a feature vector may include semantic embeddings, cosine similarity scores, cluster assignment probabilities, etc. In various embodiments, certain pre-processing techniques may be used to normalize the values in different dimensions of the feature vector.

In some embodiments, an unsupervised learning technique may be used. The training samples used for an unsupervised model may also be represented by feature vectors but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may be intended to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in prompt-to-query relevance prediction, the objective function may correspond to cross-entropy loss calculated between predicted relevance and actual relevance scores. In various embodiments, the error rate may be measured as cross-entropy loss, L1 loss (e.g., the sum of absolute differences between the predicted values and the actual value), or L2 loss (e.g., the sum of squared distances).

Figure 8:
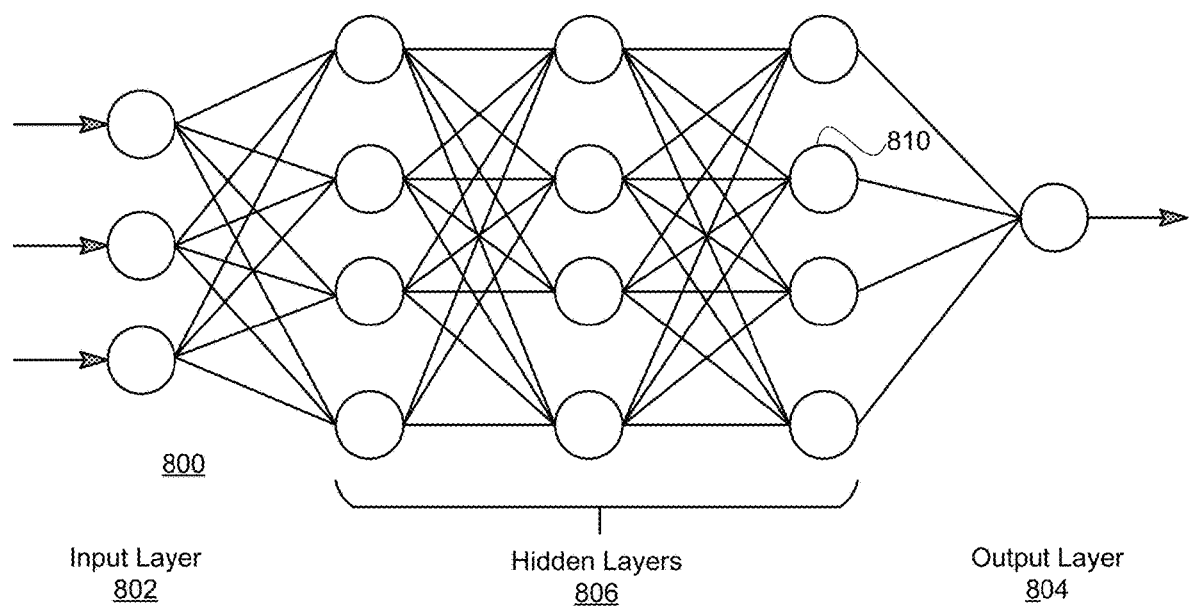
FIG. 8 is a conceptual diagram illustrating an example neural network, in accordance with some embodiments.

Referring to FIG. 8, a structure of an example neural network is illustrated, in accordance with some embodiments. The neural network 800 may receive an input and generate an output. The input may be the feature vector of a training sample in the training process and the feature vector of an actual case when the neural network is making an inference. The output may be prediction, classification, or another determination performed by the neural network. The neural network 800 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layer and pooling layer may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be presented for the generation of a specific format of the output. For example, a custom layer may be used for question clustering or prompt embedding alignment.

The order of layers and the number of layers of the neural network 800 may vary in different embodiments. In various embodiments, a neural network 800 includes one or more layers 802, 804, and 806, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes 810, kernels, and/or coefficients. Training of a neural network, such as the NN 800, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Training of a machine learning model may include an iterative process that includes iterations of making determinations, monitoring the performance of the machine learning model using the objective function, and backpropagation to adjust the weights (e.g., weights, kernel values, coefficients) in various nodes 810. For example, a computing device may receive a training set that includes segmented text divisions with prompts and embeddings. Each training sample in the training set may be assigned with labels indicating the relevance, context, or semantic similarity to queries or other entities. The computing device, in a forward propagation, may use the machine learning model to generate predicted embeddings or prompt relevancy scores. The computing device may compare the predicted scores with the labels of the training sample. The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prompt relevance prediction, document clustering, or question-based information retrieval or another suitable task for which the model is trained.

In various embodiments, the training samples described above may be refined and used to continue re-training the model, improving the model's ability to perform the inference tasks. In some embodiments, these training and re-training processes may repeat, resulting in a computer system that continues to improve its functionality through the use-retraining cycle. For example, after the model is trained, multiple rounds of re-training may be performed. The process may include periodically retraining the machine learning model. The periodic retraining may include obtaining an additional set of training data, such as through other sources, by usage of users, and by using the trained machine learning model to generate additional samples. The additional set of training data and later retraining may be based on updated data describing updated parameters in training samples. The process may also include applying the additional set of training data to the machine learning model and adjusting parameters of the machine learning model based on the applying of the additional set of training data to the machine learning model. The additional set of training data may include any features and/or characteristics that are mentioned above.

Computing Machine Architecture

Figure 9:
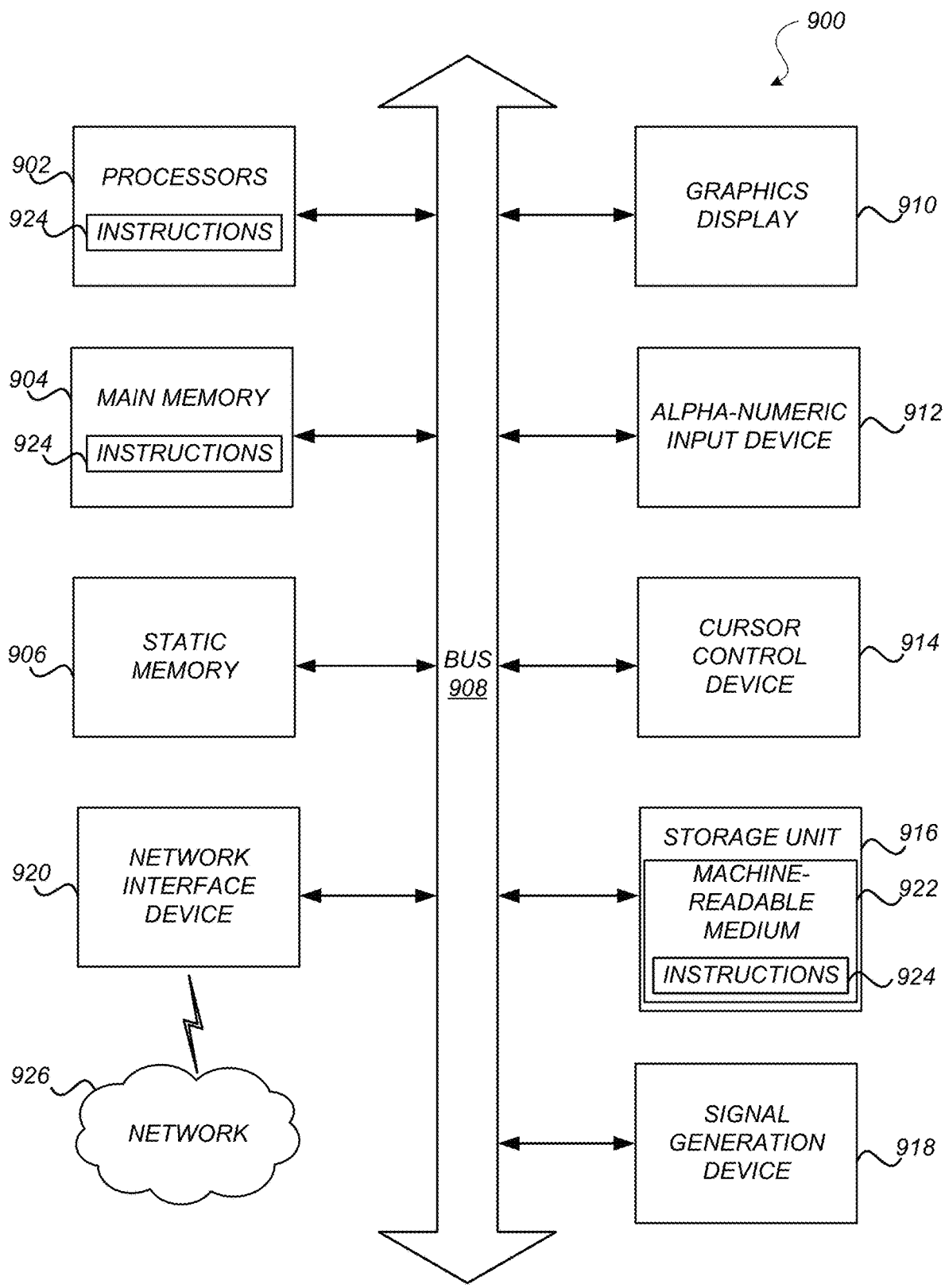
FIG. 9 is a block diagram illustrating components of an example computing machine, in accordance with some embodiments.

FIG. 9 is a block diagram illustrating components of an example computing machine that is capable of reading instructions from a computer-readable medium and executing them in a processor (or controller). A computer described herein may include a single computing machine shown in FIG. 9, a virtual machine, a distributed computing system that includes multiple nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the knowledge management system 110, the data sources 120, the client device 130, the model serving system 145, and various engines, interfaces, terminals, and machines shown in FIG. 2. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the terms "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 may also include a memory 904 that stores computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 902 and reduce the space required for the memory 904. For example, the database processing techniques and machine learning methods described herein reduce the complexity of the computation of the processors 902 by applying one or more novel techniques that simplify the steps in training, reaching convergence, and generating results of the processors 902. The algorithms described herein also reduce the size of the models and datasets to reduce the storage space requirement for memory 904.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processor 902, displays a graphical user interface (GUI) to display one or more results and data generated by the processes described herein. The computer system 900 may also include an alphanumeric input device 912 (e.g., a keyboard), a cursor control device 914 (e.g., a mouse, a trackball, a joystick, a motion sensor, or other pointing instruments), a storage unit 916 (a hard drive, a solid-state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which are stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure. Persons skilled in the relevant art can appreciate that many modifications and variations are possible in light of the above disclosure. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for accurate retrieval of relevant information from unstructured text, the computer-implemented method comprising:
    receiving a set of data instances;
    extracting a plurality of entities from the set of data instances;
    converting the plurality of entities into a plurality of entity embeddings, each entity embedding representing an entity in a latent space;
    generating a reference embedding that has a same length as the plurality of entity embeddings;
    comparing each value in each entity embedding to a corresponding value of the reference embedding;
    generating a plurality of entity fingerprints, each entity fingerprint corresponding to an entity embedding, wherein each entity fingerprint is generated based on comparing values in each entity embedding to corresponding values of the reference embedding;
    storing the plurality of entity fingerprints to represent the plurality of entities
    generating reusable code for task based on previously tagged meta-information;
    storing the code as one or more integer identifiers linked to the task;
    searching a task integer table for matches to a query fingerprint; and
    executing matched code to generate a response.

2. The computer-implemented method of claim 1, wherein the set of data instances comprises a document of unstructured text, an image file, and an audio file.

3. The computer-implemented method of claim 1, wherein extracting the plurality of entities from the set of data instances comprises:
    segmenting the data instances into segments; and
    identifying entities within each segment using one or more natural language processing models.

4. The computer-implemented method of claim 1, wherein converting the plurality of entities into the plurality of entity embeddings comprises:
    inputting text corresponding to an entity to an encoder-based language model to generate an embedding vector, the embedding vector being the entity embedding of the entity.

5. The computer-implemented method of claim 1, wherein generating the reference embedding comprises:
    aggregating the plurality of entity embeddings using a statistical measure, the statistical measure being mean, median, mode, a weighted combination, or a Fourier transform.

6. The computer-implemented method of claim 1, wherein comparing, for each value in each entity embedding, the value to a corresponding value of the reference embedding comprises:
    determining, for each value, whether the value exceeds the corresponding value of the reference embedding using a Boolean logic operation.

7. The computer-implemented method of claim 1, wherein generating the plurality of entity fingerprints comprises:
for a particular entity embedding:
determining, for each value in the particular entity embedding, whether the value is larger or smaller than the corresponding value in the reference embedding;
responsive to the value in the particular entity embedding being larger than the corresponding value in the reference embedding, assigning a first value to a position of the entity fingerprint, the position corresponding to a position of the value in the particular entity embedding; and
responsive to the value in the particular entity embedding being smaller than the corresponding value in the reference embedding, assigning a second value to the position of the entity fingerprint.

8. The computer-implemented method of claim 1, wherein the entity fingerprints are N-bit integers that uniquely represent the entities, and N being 32, 64, 128, 256, or 512.

9. The computer-implemented method of claim 1, further comprising:
receiving a query;
converting the query into a query embedding;
converting the query embedding into a query fingerprint; and
comparing the query fingerprint with the plurality of entity fingerprints to identify one or more entity fingerprints that are relevant to the query fingerprint.

10. The computer-implemented method of claim 9, wherein comparing the query fingerprint with the plurality of entity fingerprints comprises:
calculating a similarity metric between the query fingerprint and each of the plurality of entity fingerprints to determine one or more close matches.

11. The computer-implemented method of claim 10, wherein calculating the similarity metric between the query fingerprint and an entity fingerprint comprises:
passing, bitwise, values in the query fingerprint and the entity fingerprint into one or more logical circuits;
accumulating bit outputs of the one or more logical circuits.

12. The computer-implemented method of claim 9, further comprising:
identifying one or more entities corresponding to one or more identified entity fingerprints; and
returning identified entities as part of a response to the query.

13. The computer-implemented method of claim 9, wherein comparing the query fingerprint with the plurality of entity fingerprints comprises:
applying keyword fingerprints for identifying the one or more entity fingerprints.

14. The computer-implemented method of claim 1, further comprising:
constructing a knowledge graph, wherein constructing the knowledge graph comprises:
representing entities as nodes;
representing relationships between the entities as edges; and
annotating one or more edges with metadata.

15. The computer-implemented method of claim 14, wherein constructing the knowledge graph further comprises:
fusing nodes representing equivalent entities by analyzing textual similarity, semantic embedding similarity, or context within the knowledge graph.

16. The computer-implemented method of claim 1, further comprising:
assigning meta-information to each entity fingerprint, wherein the meta-information indicates additional characteristics of an entity, the meta-information being represented as extended bits appended to the entity fingerprint, wherein the meta-information identifies a category of an entity, wherein the category is a domain type, a data source, an ownership of document, an ontological category, a user annotation, or an entity lineage.

17. The computer-implemented method of claim 1, wherein the set of data instances are stored in data storage and the plurality of entity fingerprints are stored in a random-access memory for improving comparison speed.

18. A system comprising:
one or more processors; and
memory storing instructions, wherein the instructions, when executed by the one or more processors, cause the one or more processors to perform steps comprising:
receiving a set of data instances;
extracting a plurality of entities from the set of data instances;
converting the plurality of entities into a plurality of entity embeddings, each entity embedding representing an entity in a latent space;
generating a reference embedding that has a same length as the plurality of entity embeddings;
comparing each value in each entity embedding to a corresponding value of the reference embedding;
generating a plurality of entity fingerprints, each entity fingerprint corresponding to an entity embedding, wherein each entity fingerprint is generated based on comparing values in each entity embedding to corresponding values of the reference embedding;
storing the plurality of entity fingerprints to represent the plurality of entities
generating reusable code for task based on previously tagged meta-information;
storing the code as one or more integer identifiers linked to the task;
searching a task integer table for matches to a query fingerprint; and
executing matched code to generate a response.

19. A system comprising:
a data store that stores a set of data instances;
a computing system comprising one or more processors and memory, the memory storing instructions, wherein the instructions, when executed by the one or more processors, cause the one or more processors to perform steps comprising:
extracting a plurality of entities from the set of data instances;
converting the plurality of entities into a plurality of entity embeddings, each entity embedding representing an entity in a latent space;
generating a reference embedding that has a same length as the plurality of entity embeddings;
comparing each value in each entity embedding to a corresponding value of the reference embedding; and generating a plurality of entity fingerprints, each entity fingerprint corresponding to an entity embedding, wherein each entity fingerprint is based on comparing values in each entity embedding to corresponding values of the reference embedding;

generating reusable code for task based on previously tagged meta-information;

storing the code as one or more integer identifiers linked to the task;

searching a task integer table for matches to a query fingerprint; and executing matched code to generate a response; and random-access memory storing the plurality of entity fingerprints to represent the plurality of entities.

* * * * *